United States Patent
Keyes et al.

(10) Patent No.: US 12,533,185 B2
(45) Date of Patent: Jan. 27, 2026

(54) BASKET END EFFECTOR WITH DISTAL POSITION SENSOR

(71) Applicant: Biosense Webster (Israel) Ltd., Yokneam (IL)

(72) Inventors: Joseph Thomas Keyes, Sierra Madre, CA (US); Kevin Justin Herrera, West Covina, CA (US); Nathaniel Jenkins, Irvine, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 383 days.

(21) Appl. No.: 18/128,054

(22) Filed: Mar. 29, 2023

(65) Prior Publication Data

US 2024/0216045 A1   Jul. 4, 2024

Related U.S. Application Data

(60) Provisional application No. 63/477,425, filed on Dec. 28, 2022.

(51) Int. Cl.
| | |
|---|---|
| *A61B 18/14* | (2006.01) |
| *A61B 18/00* | (2006.01) |
| *A61B 34/20* | (2016.01) |

(52) U.S. Cl.
CPC ...... *A61B 18/1492* (2013.01); *A61B 2018/00267* (2013.01); *A61B 2018/00357* (2013.01);
(Continued)

(58) Field of Classification Search
CPC ........ A61B 18/1492; A61B 2034/2051; A61B 2018/00267; A61B 2018/00357;
(Continued)

(56) References Cited

U.S. PATENT DOCUMENTS

| | | |
|---|---|---|
| 3,952,747 A | 4/1976 | Kimmell, Jr. |
| 4,699,147 A | 10/1987 | Chilson et al. |

(Continued)

FOREIGN PATENT DOCUMENTS

| | | |
|---|---|---|
| CN | 105761835 A | 7/2016 |
| CN | 111248993 A | 6/2020 |

(Continued)

OTHER PUBLICATIONS

Extended European Search Report & Opinion dated Oct. 23, 2023, from corresponding European Application No. 23170306.7.
(Continued)

*Primary Examiner* — Linda C Dvorak
*Assistant Examiner* — Abigail Bock

(57) ABSTRACT

Systems and methods presented herein generally include a catheter with a basket assembly at a distal tip having an atraumatic structure on a distal portion of the basket assembly and a distal sensor coupled to the atraumatic structure. The basket assembly includes spines that collapse for delivery through a delivery sheath catheter and self-expand upon exiting a distal end of the delivery sheath catheter. The basket assembly can further include a proximal sensor coupled to a shaft of the catheter, and position signals from the shaft sensor and the distal sensor can be used to determine position of electrodes of the basket assembly when the basket assembly is pressed to tissue or another surface.

16 Claims, 15 Drawing Sheets

(52) U.S. Cl.
CPC .............. *A61B 2018/00577* (2013.01); *A61B 2018/00613* (2013.01); *A61B 2018/00767* (2013.01); *A61B 2018/00839* (2013.01); *A61B 2018/1467* (2013.01); *A61B 2034/2051* (2016.02)

(58) Field of Classification Search
CPC ........... A61B 2018/00613; A61B 2018/00767; A61B 2018/00839; A61B 2018/1467
See application file for complete search history.

(56) References Cited

U.S. PATENT DOCUMENTS

| | | |
|---|---|---|
| 4,940,064 A | 7/1990 | Desai |
| 5,215,103 A | 6/1993 | Desai |
| 5,255,679 A | 10/1993 | Imran |
| 5,293,869 A | 3/1994 | Edwards et al. |
| 5,309,910 A | 5/1994 | Edwards et al. |
| 5,313,943 A | 5/1994 | Houser et al. |
| 5,324,284 A | 6/1994 | Imran |
| 5,345,936 A | 9/1994 | Pomeranz et al. |
| 5,365,926 A | 11/1994 | Desai |
| 5,391,199 A | 2/1995 | Ben-Haim |
| 5,396,887 A | 3/1995 | Imran |
| 5,400,783 A | 3/1995 | Pomeranz et al. |
| 5,411,025 A | 5/1995 | Webster, Jr. |
| 5,415,166 A | 5/1995 | Imran |
| 5,443,489 A | 8/1995 | Ben-Haim |
| 5,456,254 A | 10/1995 | Pietroski et al. |
| 5,465,717 A | 11/1995 | Imran et al. |
| 5,476,495 A | 12/1995 | Kordis et al. |
| 5,499,981 A | 3/1996 | Kordis |
| 5,526,810 A | 6/1996 | Wang |
| 5,546,940 A | 8/1996 | Panescu et al. |
| 5,549,108 A | 8/1996 | Edwards et al. |
| 5,558,073 A | 9/1996 | Pomeranz et al. |
| 5,558,091 A | 9/1996 | Acker et al. |
| 5,577,509 A | 11/1996 | Panescu et al. |
| 5,595,183 A | 1/1997 | Swanson et al. |
| 5,598,848 A | 2/1997 | Swanson et al. |
| 5,609,157 A | 3/1997 | Panescu et al. |
| 5,628,313 A | 5/1997 | Webster, Jr. |
| 5,681,280 A | 10/1997 | Rusk et al. |
| 5,718,241 A | 2/1998 | Ben-Haim et al. |
| 5,722,401 A | 3/1998 | Pietroski et al. |
| 5,722,403 A | 3/1998 | McGee et al. |
| 5,725,525 A | 3/1998 | Kordis |
| 5,730,128 A | 3/1998 | Pomeranz et al. |
| 5,772,590 A | 6/1998 | Webster, Jr. |
| 5,782,239 A | 7/1998 | Webster, Jr. |
| 5,782,899 A | 7/1998 | Imran |
| 5,823,189 A | 10/1998 | Kordis |
| 5,881,727 A | 3/1999 | Edwards |
| 5,893,847 A | 4/1999 | Kordis |
| 5,904,680 A | 5/1999 | Kordis et al. |
| 5,911,739 A | 6/1999 | Kordis et al. |
| 5,928,228 A | 7/1999 | Kordis et al. |
| 5,944,022 A | 8/1999 | Nardella et al. |
| 5,968,040 A | 10/1999 | Swanson et al. |
| 5,983,126 A | 11/1999 | Wittkampf |
| 6,014,579 A | 1/2000 | Pomeranz et al. |
| 6,014,590 A | 1/2000 | Whayne et al. |
| 6,023,638 A | 2/2000 | Swanson |
| 6,119,030 A | 9/2000 | Morency |
| 6,142,993 A | 11/2000 | Whayne et al. |
| 6,172,499 B1 | 1/2001 | Ashe |
| 6,198,974 B1 | 3/2001 | Webster, Jr. |
| 6,216,043 B1 | 4/2001 | Swanson et al. |
| 6,216,044 B1 | 4/2001 | Kordis |
| 6,239,724 B1 | 5/2001 | Doron et al. |
| 6,332,089 B1 | 12/2001 | Acker et al. |
| 6,428,537 B1 | 8/2002 | Swanson et al. |
| 6,456,864 B1 | 9/2002 | Swanson et al. |
| 6,484,118 B1 | 11/2002 | Govari |
| 6,574,492 B1 | 6/2003 | Ben-Haim et al. |
| 6,584,345 B2 | 6/2003 | Govari |
| 6,600,948 B2 | 7/2003 | Ben-Haim et al. |
| 6,618,612 B1 | 9/2003 | Acker et al. |
| 6,690,963 B2 | 2/2004 | Ben-Haim et al. |
| 6,738,655 B1 | 5/2004 | Sen et al. |
| 6,741,878 B2 | 5/2004 | Fuimaono et al. |
| 6,748,255 B2 | 6/2004 | Fuimaono et al. |
| 6,780,183 B2 | 8/2004 | Jimenez, Jr. et al. |
| 6,788,967 B2 | 9/2004 | Ben-Haim et al. |
| 6,837,886 B2 | 1/2005 | Collins et al. |
| 6,866,662 B2 | 3/2005 | Fuimaono et al. |
| 6,892,091 B1 | 5/2005 | Ben-Haim et al. |
| 6,970,730 B2 | 11/2005 | Fuimaono et al. |
| 6,973,340 B2 | 12/2005 | Fuimaono et al. |
| 6,980,858 B2 | 12/2005 | Fuimaono et al. |
| 6,987,995 B2 | 1/2006 | Drysen |
| 7,048,734 B1 | 5/2006 | Fleischman et al. |
| 7,142,903 B2 | 11/2006 | Rodriguez et al. |
| 7,149,563 B2 | 12/2006 | Fuimaono et al. |
| 7,255,695 B2 | 8/2007 | Falwell et al. |
| 7,257,434 B2 | 8/2007 | Fuimaono et al. |
| 7,274,957 B2 | 9/2007 | Drysen |
| 7,377,906 B2 | 5/2008 | Selkee |
| 7,399,299 B2 | 7/2008 | Daniel et al. |
| 7,410,486 B2 | 8/2008 | Fuimaono et al. |
| 7,522,950 B2 | 4/2009 | Fuimaono et al. |
| 7,536,218 B2 | 5/2009 | Govari et al. |
| 7,591,799 B2 | 9/2009 | Selkee |
| 7,593,760 B2 | 9/2009 | Rodriguez et al. |
| RE41,334 E | 5/2010 | Beatty et al. |
| 7,720,517 B2 | 5/2010 | Drysen |
| 7,756,576 B2 | 7/2010 | Levin |
| 7,794,473 B2 | 9/2010 | Tessmer |
| 7,846,157 B2 | 12/2010 | Kozel |
| 7,848,787 B2 | 12/2010 | Osadchy |
| 7,853,302 B2 | 12/2010 | Rodriguez et al. |
| 7,869,865 B2 | 1/2011 | Govari et al. |
| 7,930,018 B2 | 4/2011 | Harlev et al. |
| 8,000,765 B2 | 8/2011 | Rodriguez et al. |
| 8,007,495 B2 | 8/2011 | McDaniel et al. |
| 8,021,327 B2 | 9/2011 | Selkee |
| 8,048,063 B2 | 11/2011 | Aeby et al. |
| 8,103,327 B2 | 1/2012 | Harlev et al. |
| 8,167,845 B2 | 5/2012 | Wang et al. |
| 8,224,416 B2 | 7/2012 | De La Rama et al. |
| 8,235,988 B2 | 8/2012 | Davis et al. |
| 8,275,440 B2 | 9/2012 | Rodriguez et al. |
| 8,295,902 B2 | 10/2012 | Salahieh et al. |
| 8,346,339 B2 | 1/2013 | Kordis et al. |
| 8,357,152 B2 | 1/2013 | Govari et al. |
| 8,435,232 B2 | 5/2013 | Aeby et al. |
| 8,447,377 B2 | 5/2013 | Harlev et al. |
| 8,456,182 B2 | 6/2013 | Bar-Tal et al. |
| 8,475,450 B2 | 7/2013 | Govari et al. |
| 8,498,686 B2 | 7/2013 | Grunewald |
| 8,517,999 B2 | 8/2013 | Pappone et al. |
| 8,545,490 B2 | 10/2013 | Mihajlovic et al. |
| 8,560,086 B2 | 10/2013 | Just et al. |
| 8,567,265 B2 | 10/2013 | Aeby et al. |
| 8,712,550 B2 | 4/2014 | Grunewald |
| 8,728,065 B2 | 5/2014 | Fish et al. |
| 8,755,861 B2 | 6/2014 | Harlev et al. |
| 8,825,130 B2 | 9/2014 | Just et al. |
| 8,906,011 B2 | 12/2014 | Gelbart et al. |
| 8,945,120 B2 | 2/2015 | McDaniel et al. |
| 8,979,839 B2 | 3/2015 | De La Rama et al. |
| 9,037,264 B2 | 5/2015 | Just et al. |
| 9,131,980 B2 | 9/2015 | Bloom |
| 9,204,929 B2 | 12/2015 | Solis |
| 9,277,960 B2 | 3/2016 | Weinkam et al. |
| 9,314,208 B1 | 4/2016 | Altmann et al. |
| 9,339,331 B2 | 5/2016 | Tegg et al. |
| 9,486,282 B2 | 11/2016 | Solis |
| 9,554,718 B2 | 1/2017 | Bar-Tal et al. |
| D782,686 S | 3/2017 | Werneth et al. |
| 9,585,588 B2 | 3/2017 | Marecki et al. |
| 9,597,036 B2 | 3/2017 | Aeby et al. |
| 9,687,297 B2 | 6/2017 | Just et al. |
| 9,693,733 B2 | 7/2017 | Altmann et al. |

(56) References Cited

U.S. PATENT DOCUMENTS

| | | |
|---|---|---|
| 9,782,099 B2 | 10/2017 | Williams et al. |
| 9,788,895 B2 | 10/2017 | Solis |
| 9,801,681 B2 | 10/2017 | Laske et al. |
| 9,814,618 B2 | 11/2017 | Nguyen et al. |
| 9,833,161 B2 | 12/2017 | Govari |
| 9,848,795 B2 | 12/2017 | Marecki et al. |
| 9,894,756 B2 | 2/2018 | Weinkam et al. |
| 9,895,073 B2 | 2/2018 | Solis |
| 9,907,609 B2 | 3/2018 | Cao et al. |
| 9,974,460 B2 | 5/2018 | Wu et al. |
| 9,986,949 B2 | 6/2018 | Govari et al. |
| 9,993,160 B2 | 6/2018 | Salvestro et al. |
| 10,014,607 B1 | 7/2018 | Govari et al. |
| 10,028,376 B2 | 7/2018 | Weinkam et al. |
| 10,034,637 B2 | 7/2018 | Harlev et al. |
| 10,039,494 B2 | 8/2018 | Altmann et al. |
| 10,045,707 B2 | 8/2018 | Govari |
| 10,078,713 B2 | 9/2018 | Auerbach et al. |
| 10,111,623 B2 | 10/2018 | Jung et al. |
| 10,130,420 B2 | 11/2018 | Basu et al. |
| 10,136,828 B2 | 11/2018 | Houben et al. |
| 10,143,394 B2 | 12/2018 | Solis |
| 10,172,536 B2 | 1/2019 | Maskara et al. |
| 10,182,762 B2 | 1/2019 | Just et al. |
| 10,194,818 B2 | 2/2019 | Williams et al. |
| 10,201,311 B2 | 2/2019 | Chou et al. |
| 10,219,860 B2 | 3/2019 | Harlev et al. |
| 10,219,861 B2 | 3/2019 | Just et al. |
| 10,231,328 B2 | 3/2019 | Weinkam et al. |
| 10,238,309 B2 | 3/2019 | Bar-Tal et al. |
| 10,278,590 B2 | 5/2019 | Salvestro et al. |
| D851,774 S | 6/2019 | Werneth et al. |
| 10,314,505 B2 | 6/2019 | Williams et al. |
| 10,314,507 B2 | 6/2019 | Govari et al. |
| 10,314,648 B2 | 6/2019 | Ge et al. |
| 10,314,649 B2 | 6/2019 | Bakos et al. |
| 10,342,608 B2 | 7/2019 | Wang et al. |
| 10,349,855 B2 | 7/2019 | Zeidan et al. |
| 10,350,003 B2 | 7/2019 | Weinkam et al. |
| 10,362,991 B2 | 7/2019 | Tran et al. |
| 10,375,827 B2 | 8/2019 | Weinkam et al. |
| 10,376,170 B2 | 8/2019 | Quinn et al. |
| 10,376,221 B2 | 8/2019 | Iyun et al. |
| 10,398,348 B2 | 9/2019 | Osadchy et al. |
| 10,403,053 B2 | 9/2019 | Katz et al. |
| 10,441,188 B2 | 10/2019 | Katz et al. |
| 10,470,682 B2 | 11/2019 | Deno et al. |
| 10,470,714 B2 | 11/2019 | Altmann et al. |
| 10,482,198 B2 | 11/2019 | Auerbach et al. |
| 10,492,857 B2 | 12/2019 | Guggenberger et al. |
| 10,542,620 B2 | 1/2020 | Weinkam et al. |
| 10,575,743 B2 | 3/2020 | Basu et al. |
| 10,575,745 B2 | 3/2020 | Solis |
| 10,582,871 B2 | 3/2020 | Williams et al. |
| 10,582,894 B2 | 3/2020 | Ben Zrihem et al. |
| 10,596,346 B2 | 3/2020 | Aeby et al. |
| 10,602,947 B2 | 3/2020 | Govari et al. |
| 10,617,467 B2 | 4/2020 | Viswanathan et al. |
| 10,617,867 B2 | 4/2020 | Viswanathan et al. |
| 10,660,702 B2 | 5/2020 | Viswanathan et al. |
| 10,667,753 B2 | 6/2020 | Werneth et al. |
| 10,674,929 B2 | 6/2020 | Houben et al. |
| 10,681,805 B2 | 6/2020 | Weinkam et al. |
| 10,682,181 B2 | 6/2020 | Cohen et al. |
| 10,687,892 B2 | 6/2020 | Long et al. |
| 10,688,278 B2 | 6/2020 | Beeckler et al. |
| 10,702,178 B2 | 7/2020 | Dahlen et al. |
| 10,716,477 B2 | 7/2020 | Salvestro et al. |
| 10,758,304 B2 | 9/2020 | Aujla |
| 10,765,371 B2 | 9/2020 | Hayam et al. |
| 10,772,566 B2 | 9/2020 | Aujila |
| 10,799,281 B2 | 10/2020 | Goertzen et al. |
| 10,842,558 B2 | 11/2020 | Harlev et al. |
| 10,842,561 B2 | 11/2020 | Viswanathan et al. |
| 10,863,914 B2 | 12/2020 | Govari et al. |
| 10,881,376 B2 | 1/2021 | Shemesh et al. |
| 10,898,139 B2 | 1/2021 | Guta et al. |
| 10,905,329 B2 | 2/2021 | Bar-Tal et al. |
| 10,912,484 B2 | 2/2021 | Ziv-Ari et al. |
| 10,918,306 B2 | 2/2021 | Govari et al. |
| 10,939,871 B2 | 3/2021 | Altmann et al. |
| 10,952,795 B2 | 3/2021 | Cohen et al. |
| 10,973,426 B2 | 4/2021 | Williams et al. |
| 10,973,461 B2 | 4/2021 | Baram et al. |
| 10,987,045 B2 | 4/2021 | Basu et al. |
| 11,006,902 B1 | 5/2021 | Bonyak et al. |
| 11,040,208 B1 | 6/2021 | Govari et al. |
| 11,045,628 B2 | 6/2021 | Beeckler et al. |
| 11,051,877 B2 | 7/2021 | Sliwa et al. |
| 11,071,585 B2 | 7/2021 | Zhang et al. |
| 11,109,788 B2 | 9/2021 | Rottmann et al. |
| 11,116,435 B2 | 9/2021 | Urman et al. |
| 11,129,574 B2 | 9/2021 | Cohen et al. |
| 11,160,482 B2 | 11/2021 | Solis |
| 11,164,371 B2 | 11/2021 | Yellin et al. |
| 2002/0198522 A1 | 12/2002 | Kordis et al. |
| 2004/0210121 A1 | 10/2004 | Fuimaono et al. |
| 2006/0009689 A1 | 1/2006 | Fuimaono et al. |
| 2006/0009690 A1 | 1/2006 | Fuimaono et al. |
| 2006/0058813 A1 | 3/2006 | Teague et al. |
| 2006/0100669 A1 | 5/2006 | Fuimaono et al. |
| 2007/0093806 A1 | 4/2007 | Desai et al. |
| 2007/0276212 A1 | 11/2007 | Fuimaono et al. |
| 2008/0234564 A1 | 9/2008 | Beatty et al. |
| 2010/0063478 A1 | 3/2010 | Selkee |
| 2011/0118726 A1 | 5/2011 | De La Rama et al. |
| 2011/0130648 A1 | 6/2011 | Beeckler et al. |
| 2011/0160574 A1 | 6/2011 | Harlev et al. |
| 2011/0190625 A1 | 8/2011 | Harlev et al. |
| 2011/0245756 A1 | 10/2011 | Arora et al. |
| 2011/0301597 A1 | 12/2011 | McDaniel et al. |
| 2012/0271136 A1 | 10/2012 | Kordis et al. |
| 2012/0271138 A1 | 10/2012 | Kordis et al. |
| 2012/0271140 A1 | 10/2012 | Kordis et al. |
| 2013/0090651 A1 | 4/2013 | Smith |
| 2013/0150693 A1 | 6/2013 | D'Angelo |
| 2013/0172715 A1 | 7/2013 | Just et al. |
| 2013/0172872 A1 | 7/2013 | Subramaniam et al. |
| 2013/0172883 A1 | 7/2013 | Lopes et al. |
| 2013/0178850 A1 | 7/2013 | Lopes et al. |
| 2013/0190587 A1 | 7/2013 | Lopes et al. |
| 2013/0296852 A1 | 11/2013 | Madjarov et al. |
| 2014/0025069 A1 | 1/2014 | Willard et al. |
| 2014/0052118 A1 | 2/2014 | Laske et al. |
| 2014/0088588 A1 | 3/2014 | Jarrard |
| 2014/0180147 A1 | 6/2014 | Thakur et al. |
| 2014/0180151 A1 | 6/2014 | Maskara et al. |
| 2014/0180152 A1 | 6/2014 | Maskara et al. |
| 2014/0257069 A1 | 9/2014 | Eliason et al. |
| 2014/0276712 A1 | 9/2014 | Mallin et al. |
| 2014/0276746 A1 | 9/2014 | Nabutovsky et al. |
| 2014/0288552 A1 | 9/2014 | Kunis |
| 2014/0309512 A1 | 10/2014 | Govari et al. |
| 2014/0309513 A1 | 10/2014 | Fish et al. |
| 2014/0350551 A1 | 11/2014 | Raatikka et al. |
| 2015/0011991 A1 | 1/2015 | Buysman et al. |
| 2015/0045863 A1 | 2/2015 | Litscher et al. |
| 2015/0080693 A1 | 3/2015 | Solis |
| 2015/0105770 A1 | 4/2015 | Amit |
| 2015/0119878 A1 | 4/2015 | Heisel et al. |
| 2015/0133919 A1 | 5/2015 | Mcdaniel et al. |
| 2015/0208942 A1 | 7/2015 | Bar-Tal et al. |
| 2015/0223757 A1 | 8/2015 | Werneth et al. |
| 2015/0250424 A1 | 9/2015 | Govari et al. |
| 2015/0270634 A1 | 9/2015 | Buesseler et al. |
| 2015/0282859 A1 | 10/2015 | Bencini et al. |
| 2015/0342491 A1 | 12/2015 | Marecki et al. |
| 2015/0342532 A1 | 12/2015 | Basu et al. |
| 2015/0351625 A1 | 12/2015 | Schroth et al. |
| 2015/0366508 A1 | 12/2015 | Chou et al. |
| 2016/0081746 A1 | 3/2016 | Solis |
| 2016/0113582 A1 | 4/2016 | Altmann et al. |
| 2016/0113709 A1 | 4/2016 | Maor |
| 2016/0183877 A1 | 6/2016 | Williams et al. |

(56) References Cited

U.S. PATENT DOCUMENTS

| | | |
|---|---|---|
| 2016/0228023 A1 | 8/2016 | Govari |
| 2016/0228062 A1 | 8/2016 | Altmann et al. |
| 2016/0278853 A1 | 9/2016 | Ogle et al. |
| 2016/0302858 A1 | 10/2016 | Bencini |
| 2016/0324573 A1 | 11/2016 | Mickelson et al. |
| 2016/0338770 A1 | 11/2016 | Bar-Tal et al. |
| 2017/0027638 A1 | 2/2017 | Solis |
| 2017/0035496 A1 | 2/2017 | Nagale et al. |
| 2017/0065227 A1 | 3/2017 | Marrs et al. |
| 2017/0071543 A1 | 3/2017 | Basu et al. |
| 2017/0071544 A1 | 3/2017 | Basu et al. |
| 2017/0071665 A1 | 3/2017 | Solis |
| 2017/0095173 A1 | 4/2017 | Bar-Tal et al. |
| 2017/0100187 A1 | 4/2017 | Basu et al. |
| 2017/0143227 A1 | 5/2017 | Marecki et al. |
| 2017/0156790 A1 | 6/2017 | Aujla |
| 2017/0164858 A1 | 6/2017 | Basu |
| 2017/0172442 A1 | 6/2017 | Govari |
| 2017/0172651 A1 | 6/2017 | Gross et al. |
| 2017/0185702 A1 | 6/2017 | Auerbach et al. |
| 2017/0202515 A1 | 7/2017 | Zrihem et al. |
| 2017/0221262 A1 | 8/2017 | Laughner et al. |
| 2017/0224958 A1 | 8/2017 | Cummings et al. |
| 2017/0265812 A1 | 9/2017 | Williams et al. |
| 2017/0281031 A1 | 10/2017 | Houben et al. |
| 2017/0281268 A1 | 10/2017 | Tran et al. |
| 2017/0296125 A1 | 10/2017 | Altmann et al. |
| 2017/0296251 A1 | 10/2017 | Wu et al. |
| 2017/0319140 A1 | 11/2017 | Wu et al. |
| 2017/0347959 A1 | 12/2017 | Guta et al. |
| 2017/0354338 A1 | 12/2017 | Levin et al. |
| 2017/0354339 A1 | 12/2017 | Zeidan et al. |
| 2017/0354364 A1 | 12/2017 | Bar-Tal et al. |
| 2018/0000540 A1 | 1/2018 | Ogle et al. |
| 2018/0008203 A1 | 1/2018 | Iyun et al. |
| 2018/0028084 A1 | 2/2018 | Williams et al. |
| 2018/0049803 A1 | 2/2018 | Solis |
| 2018/0085064 A1 | 3/2018 | Auerbach et al. |
| 2018/0116595 A1 | 5/2018 | Ruppersberg |
| 2018/0132749 A1 | 5/2018 | Govari et al. |
| 2018/0137687 A1 | 5/2018 | Katz et al. |
| 2018/0160936 A1 | 6/2018 | Govari et al. |
| 2018/0160978 A1 | 6/2018 | Cohen et al. |
| 2018/0161577 A1 | 6/2018 | Goedeke et al. |
| 2018/0168511 A1 | 6/2018 | Hall et al. |
| 2018/0184982 A1 | 7/2018 | Basu et al. |
| 2018/0192958 A1 | 7/2018 | Wu |
| 2018/0192959 A1 | 7/2018 | Mou et al. |
| 2018/0206792 A1 | 7/2018 | Auerbach et al. |
| 2018/0228439 A1 | 8/2018 | Wu et al. |
| 2018/0235692 A1 | 8/2018 | Efimov et al. |
| 2018/0249959 A1 | 9/2018 | Osypka |
| 2018/0256109 A1 | 9/2018 | Wu et al. |
| 2018/0279954 A1 | 10/2018 | Hayam et al. |
| 2018/0303414 A1 | 10/2018 | Toth et al. |
| 2018/0303546 A1 | 10/2018 | Buysman et al. |
| 2018/0310987 A1 | 11/2018 | Altmann et al. |
| 2018/0311497 A1 | 11/2018 | Viswanathan et al. |
| 2018/0338722 A1 | 11/2018 | Altmann et al. |
| 2018/0344188 A1 | 12/2018 | Govari |
| 2018/0344202 A1 | 12/2018 | Bar-Tal et al. |
| 2018/0344251 A1 | 12/2018 | Harlev et al. |
| 2018/0344393 A1 | 12/2018 | Gruba et al. |
| 2018/0360534 A1 | 12/2018 | Teplitsky et al. |
| 2018/0365355 A1 | 12/2018 | Auerbach et al. |
| 2019/0000540 A1 | 1/2019 | Cohen et al. |
| 2019/0008582 A1 | 1/2019 | Govari et al. |
| 2019/0015007 A1 | 1/2019 | Rottmann et al. |
| 2019/0030328 A1 | 1/2019 | Stewart et al. |
| 2019/0053708 A1 | 2/2019 | Gliner |
| 2019/0059766 A1 | 2/2019 | Houben et al. |
| 2019/0069950 A1 | 3/2019 | Viswanathan et al. |
| 2019/0069954 A1 | 3/2019 | Cohen et al. |
| 2019/0117111 A1 | 4/2019 | Osadchy et al. |
| 2019/0117303 A1 | 4/2019 | Claude et al. |
| 2019/0117315 A1 | 4/2019 | Keyes et al. |
| 2019/0125338 A1 | 5/2019 | Shelton, IV et al. |
| 2019/0125437 A1 | 5/2019 | Govari et al. |
| 2019/0125439 A1 | 5/2019 | Rohl et al. |
| 2019/0133552 A1 | 5/2019 | Shemesh et al. |
| 2019/0142293 A1 | 5/2019 | Solis |
| 2019/0164633 A1 | 5/2019 | Ingel et al. |
| 2019/0167137 A1 | 6/2019 | Bar-Tal et al. |
| 2019/0167140 A1 | 6/2019 | Williams et al. |
| 2019/0188909 A1 | 6/2019 | Yellin et al. |
| 2019/0201664 A1 | 7/2019 | Govari |
| 2019/0209089 A1 | 7/2019 | Baram et al. |
| 2019/0216346 A1 | 7/2019 | Ghodrati et al. |
| 2019/0216347 A1 | 7/2019 | Ghodrati et al. |
| 2019/0231421 A1 | 8/2019 | Viswanathan et al. |
| 2019/0231423 A1 | 8/2019 | Weinkam et al. |
| 2019/0239811 A1 | 8/2019 | Just et al. |
| 2019/0246935 A1 | 8/2019 | Govari et al. |
| 2019/0298442 A1 | 10/2019 | Ogata et al. |
| 2019/0314083 A1 | 10/2019 | Herrera et al. |
| 2019/0328260 A1 | 10/2019 | Zeidan et al. |
| 2019/0336210 A1 | 11/2019 | Beeckler et al. |
| 2019/0343580 A1 | 11/2019 | Nguyen et al. |
| 2019/0350567 A1 | 11/2019 | Cummins et al. |
| 2020/0000518 A1 | 1/2020 | Kiernan et al. |
| 2020/0008705 A1 | 1/2020 | Ziv-Ari et al. |
| 2020/0008869 A1 | 1/2020 | Byrd |
| 2020/0009378 A1 | 1/2020 | Stewart et al. |
| 2020/0015876 A1 | 1/2020 | Chou et al. |
| 2020/0015890 A1 | 1/2020 | To et al. |
| 2020/0022653 A1 | 1/2020 | Moisa |
| 2020/0029845 A1 | 1/2020 | Baram et al. |
| 2020/0046421 A1 | 2/2020 | Govari |
| 2020/0046423 A1 | 2/2020 | Viswanathan et al. |
| 2020/0060569 A1 | 2/2020 | Tegg |
| 2020/0077959 A1 | 3/2020 | Altmann et al. |
| 2020/0093539 A1 | 3/2020 | Long et al. |
| 2020/0129089 A1 | 4/2020 | Gliner et al. |
| 2020/0129125 A1 | 4/2020 | Govari et al. |
| 2020/0129128 A1 | 4/2020 | Gliner et al. |
| 2020/0163707 A1 | 5/2020 | Sliwa et al. |
| 2020/0179650 A1 | 6/2020 | Beeckler et al. |
| 2020/0196896 A1 | 6/2020 | Solis |
| 2020/0205689 A1 | 7/2020 | Squires et al. |
| 2020/0205690 A1 | 7/2020 | Williams et al. |
| 2020/0205737 A1 | 7/2020 | Beeckler |
| 2020/0205876 A1 | 7/2020 | Govari |
| 2020/0205892 A1 | 7/2020 | Viswanathan et al. |
| 2020/0206461 A1 | 7/2020 | Govari et al. |
| 2020/0206498 A1 | 7/2020 | Arora et al. |
| 2020/0289197 A1 | 9/2020 | Viswanathan et al. |
| 2020/0297234 A1 | 9/2020 | Houben et al. |
| 2020/0297281 A1 | 9/2020 | Basu et al. |
| 2020/0305726 A1 | 10/2020 | Salvestro et al. |
| 2020/0305946 A1 | 10/2020 | Desimone et al. |
| 2020/0375657 A1 | 12/2020 | Olson et al. |
| 2020/0397328 A1 | 12/2020 | Altmann et al. |
| 2020/0398048 A1 | 12/2020 | Krimsky et al. |
| 2021/0015549 A1 | 1/2021 | Haghighi-Mood et al. |
| 2021/0022684 A1 | 1/2021 | Govari et al. |
| 2021/0045805 A1 | 2/2021 | Govari et al. |
| 2021/0059549 A1 | 3/2021 | Urman et al. |
| 2021/0059550 A1 | 3/2021 | Urman et al. |
| 2021/0059608 A1 | 3/2021 | Beeckler et al. |
| 2021/0059743 A1 | 3/2021 | Govari |
| 2021/0059747 A1 | 3/2021 | Krans et al. |
| 2021/0077180 A1 | 3/2021 | Govari et al. |
| 2021/0077184 A1 | 3/2021 | Basu et al. |
| 2021/0082157 A1 | 3/2021 | Rosenberg et al. |
| 2021/0085200 A1 | 3/2021 | Auerbach et al. |
| 2021/0085204 A1 | 3/2021 | Auerbach et al. |
| 2021/0085215 A1 | 3/2021 | Auerbach et al. |
| 2021/0085387 A1 | 3/2021 | Amit et al. |
| 2021/0093292 A1 | 4/2021 | Baram et al. |
| 2021/0093294 A1 | 4/2021 | Shemesh et al. |
| 2021/0093374 A1 | 4/2021 | Govari et al. |
| 2021/0093376 A1 | 4/2021 | Harlev et al. |
| 2021/0093377 A1 | 4/2021 | Herrera et al. |
| 2021/0100612 A1 | 4/2021 | Baron et al. |

(56) References Cited

U.S. PATENT DOCUMENTS

| | | |
|---|---|---|
| 2021/0113822 A1 | 4/2021 | Beeckler et al. |
| 2021/0127999 A1 | 5/2021 | Govari et al. |
| 2021/0128010 A1 | 5/2021 | Govari et al. |
| 2021/0133516 A1 | 5/2021 | Govari et al. |
| 2021/0145282 A1 | 5/2021 | Bar-Tal et al. |
| 2021/0161582 A1 | 6/2021 | Byrd et al. |
| 2021/0161592 A1 | 6/2021 | Altmann et al. |
| 2021/0162210 A1 | 6/2021 | Altmann et al. |
| 2021/0169421 A1 | 6/2021 | Govari |
| 2021/0169550 A1 | 6/2021 | Govari et al. |
| 2021/0169567 A1 | 6/2021 | Govari et al. |
| 2021/0169568 A1 | 6/2021 | Govari et al. |
| 2021/0177294 A1 | 6/2021 | Gliner et al. |
| 2021/0177356 A1 | 6/2021 | Gliner et al. |
| 2021/0177503 A1 | 6/2021 | Altmann et al. |
| 2021/0178166 A1 | 6/2021 | Govari et al. |
| 2021/0186363 A1 | 6/2021 | Gliner et al. |
| 2021/0186604 A1 | 6/2021 | Altmann et al. |
| 2021/0187241 A1 | 6/2021 | Govari et al. |
| 2021/0187254 A1 | 6/2021 | Beeckler et al. |
| 2021/0196372 A1 | 7/2021 | Altmann et al. |
| 2021/0196394 A1 | 7/2021 | Govari et al. |
| 2021/0212591 A1 | 7/2021 | Govari et al. |
| 2021/0219904 A1 | 7/2021 | Yarnitsky et al. |
| 2021/0236815 A1 | 8/2021 | Waldstreicher et al. |
| 2021/0278936 A1 | 9/2021 | Katz et al. |
| 2021/0282659 A1 | 9/2021 | Govari et al. |
| 2021/0307815 A1 | 10/2021 | Govari et al. |
| 2021/0308424 A1 | 10/2021 | Beeckler et al. |
| 2021/0338319 A1 | 11/2021 | Govari et al. |
| 2021/0369339 A1 | 12/2021 | Salazar et al. |
| 2022/0071695 A1 | 3/2022 | Beeckler et al. |
| 2022/0071696 A1 | 3/2022 | Beeckler et al. |
| 2022/0110679 A1 | 4/2022 | Wang et al. |
| 2022/0304745 A1 | 9/2022 | Olson |
| 2022/0387051 A1 | 12/2022 | Girdhar |
| 2023/0000550 A1 | 1/2023 | Nedved et al. |
| 2023/0130692 A1 | 4/2023 | Wang et al. |
| 2023/0225790 A1 | 7/2023 | Okarski |
| 2023/0346455 A1 | 11/2023 | Beeckler et al. |
| 2023/0346459 A1 | 11/2023 | Beeckler et al. |
| 2023/0346462 A1 | 11/2023 | Beeckler et al. |
| 2023/0346464 A1 | 11/2023 | Beeckler et al. |
| 2024/0216045 A1 | 7/2024 | Keyes |
| 2025/0057589 A1 | 2/2025 | Sandquist et al. |

FOREIGN PATENT DOCUMENTS

| | | |
|---|---|---|
| CN | 111248996 A | 6/2020 |
| EP | 0668740 A1 | 8/1995 |
| EP | 0644738 B1 | 3/2000 |
| EP | 0727183 B1 | 11/2002 |
| EP | 0727184 B1 | 12/2002 |
| EP | 2201905 A1 | 6/2010 |
| EP | 2783651 A1 | 10/2014 |
| EP | 2699151 B1 | 11/2015 |
| EP | 2699152 B1 | 11/2015 |
| EP | 2699153 A1 | 12/2015 |
| EP | 2498706 B1 | 4/2016 |
| EP | 2578173 B1 | 6/2017 |
| EP | 3181082 A1 | 6/2017 |
| EP | 3238645 A1 | 11/2017 |
| EP | 2884931 B1 | 1/2018 |
| EP | 3315086 A1 | 5/2018 |
| EP | 2349440 B1 | 8/2019 |
| EP | 3318211 B1 | 12/2019 |
| EP | 3581135 A1 | 12/2019 |
| EP | 2736434 B1 | 2/2020 |
| EP | 3451962 B1 | 3/2020 |
| EP | 3791816 A2 | 3/2021 |
| EP | 3972510 A1 | 3/2022 |
| EP | 4115834 A1 | 1/2023 |
| WO | WO-9421167 A1 | 9/1994 |
| WO | WO-9421169 A1 | 9/1994 |
| WO | WO-9625095 A1 | 8/1996 |
| WO | WO-9634560 A1 | 11/1996 |
| WO | WO-0182814 A2 | 5/2002 |
| WO | WO-2004087249 A2 | 10/2004 |
| WO | WO-2012100185 A2 | 7/2012 |
| WO | WO-2013052852 A1 | 4/2013 |
| WO | WO-2013162884 A1 | 10/2013 |
| WO | WO-2013173917 A1 | 11/2013 |
| WO | WO-2013176881 A1 | 11/2013 |
| WO | WO-2014176205 A1 | 10/2014 |
| WO | WO-2016019760 A1 | 2/2016 |
| WO | WO-2016044687 A1 | 3/2016 |
| WO | WO-2018111600 A1 | 6/2018 |
| WO | WO-2018191149 A1 | 10/2018 |
| WO | WO-2019084442 A1 | 5/2019 |
| WO | WO-2019143960 A1 | 7/2019 |
| WO | WO-2020026217 A1 | 2/2020 |
| WO | WO-2020206328 A1 | 10/2020 |
| WO | 2021126980 A1 | 6/2021 |
| WO | 2022001908 A1 | 1/2022 |

OTHER PUBLICATIONS

Extended European Search Report dated Feb. 2, 2023, from Corresponding European Application No. 22194819.3, 8 pages.
Extended European Search Report and Opinion dated Jun. 1, 2023, from corresponding European Application No. 23152493.5.
Extended European Search Report and Opinion dated Jun. 7, 2023, from corresponding European Application No. 23152399.4.
Extended European Search Report and Opinion dated Jun. 12, 2023, from corresponding European Application No. 23152448.9.
Extended European Search Report dated Jun. 13, 2023, from Corresponding European Application No. 23152458.8, 12 pages.
Extended European Search Report and Opinion dated Jun. 15, 2023, from corresponding European Application No. 23152482.8.
Extended European Search Report and Opinion dated Sep. 6, 2023, from corresponding European Application No. 23152472.9.
Extended European Search Report & Search Opinion dated Sep. 19, 2023, from corresponding European Application No. 23170233.3.
Extended European Search Report & Search Opinion dated Sep. 19, 2023, from corresponding European Application No. 23170325.7.
Extended European Search Report & Search Opinion dated Sep. 21, 2023, from corresponding European Application No. 23170409.9.
Extended European Search Report and Opinion dated Sep. 21, 2023, from corresponding European Application No. 23170230.9.

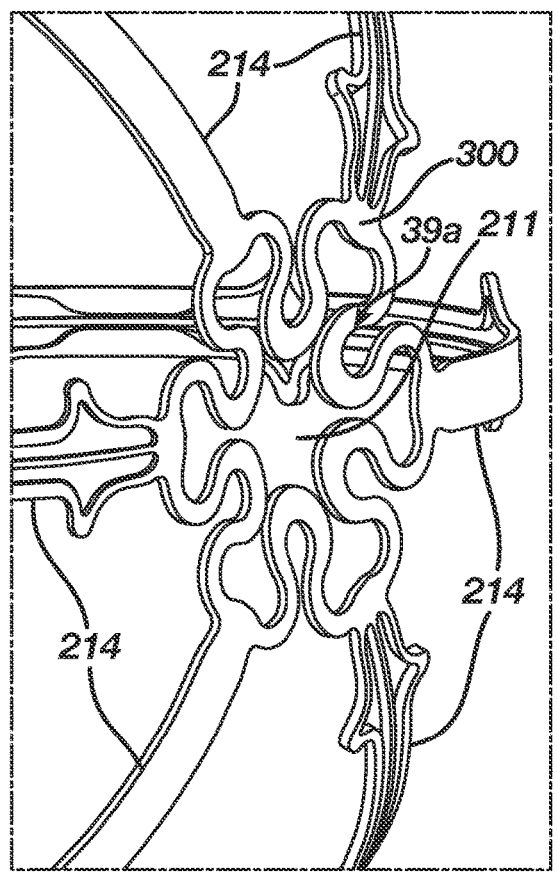
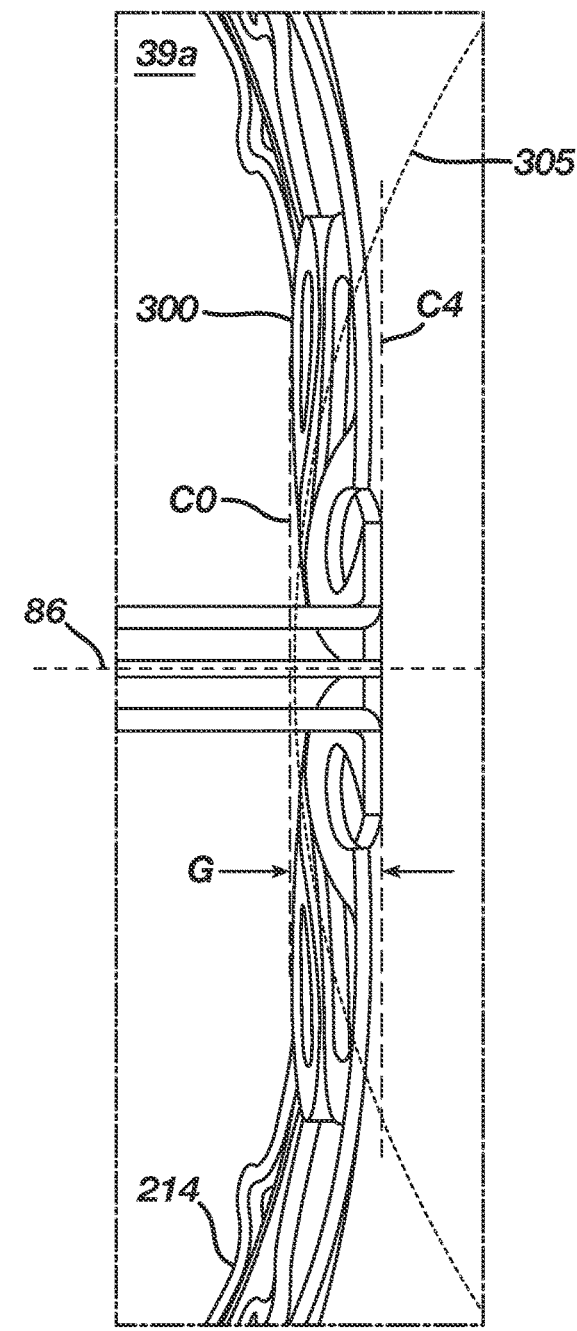
FIG. 4A  FIG. 4B

BASKET END EFFECTOR WITH DISTAL POSITION SENSOR

CROSS-REFERENCE TO RELATED APPLICATIONS

This application claims priority under 35 U.S.C. § 119 to prior filed U.S. Provisional Patent Application No. 63/477,425 filed Dec. 28, 2022, which is hereby incorporated by reference as if set forth in full herein.

FIELD

The present invention relates generally to medical devices, and in particular catheters with electrodes configured to map and/or ablate tissue, and further relates to, but not exclusively, catheters suitable for use to induce irreversible electroporation (IRE) of cardiac tissues.

BACKGROUND

Cardiac arrhythmias, such as atrial fibrillation (AF), occur when regions of cardiac tissue abnormally conduct electric signals to adjacent tissue. This disrupts the normal cardiac cycle and causes asynchronous rhythm. Certain procedures exist for treating arrhythmia, including surgically disrupting the origin of the signals causing the arrhythmia and disrupting the conducting pathway for such signals. By selectively ablating cardiac tissue by application of energy via a catheter, it is sometimes possible to cease or modify the propagation of unwanted electrical signals from one portion of the heart to another.

Many contemporary ablation approaches in the art tend to utilize radiofrequency (RF) electrical energy to heat tissue. RF ablation can have certain rare drawbacks due to operator's skill, such as heightened risk of thermal cell injury which can lead to tissue charring, burning, steam pop, phrenic nerve palsy, pulmonary vein stenosis, and esophageal fistula. Cryoablation is an alternative approach to RF ablation that can reduce some thermal risks associated with RF ablation but may present tissue damage due to the very low temperature nature of such devices. Maneuvering cryoablation devices and selectively applying cryoablation, however, is generally more challenging compared to RF ablation; therefore, cryoablation is not viable in certain anatomical geometries which may be reached by electrical ablation devices.

Some ablation approaches use irreversible electroporation (IRE) to ablate cardiac tissue using nonthermal ablation methods. IRE delivers short pulses of high voltage to tissues and generates an unrecoverable permeabilization of cell membranes. Delivery of IRE energy to tissues using multi-electrode catheters was previously proposed in the patent literature. Examples of systems and devices configured for IRE ablation are disclosed in U.S. Patent Pub. No. 2021/0169550A1, 2021/0169567A1, 2021/0169568A1, 2021/0161592A1, 2021/0196372A1, 2021/0177503A1, and 2021/0186604A1, each of which are incorporated herein by reference and attached in the Appendix of priority Patent Application No. 63/477,425.

Regions of cardiac tissue can be mapped by a catheter to identify the abnormal electrical signals. The same or different catheter can be used to perform ablation. Some example catheters include a number of spines with electrodes positioned thereon. The electrodes are generally attached to the spines and secured in place by soldering, welding, or using an adhesive. Furthermore, multiple linear spines are generally assembled together by attaching both ends of the linear spines to a tubular shaft (e.g., a pusher tube) to form a spherical basket. It is desirable to have a basket shape that is atraumatic so that tissue is not damaged when the basket is pressed to tissue and it is desirable to visualize the location of the basket in relation to tissue.

SUMMARY

An example end effector of a catheter can include a support frame and an atraumatic structure. The support frame can include a plurality of spines configured to self-expand away from a longitudinal axis from a proximal portion to a distal spine portion to form a basket configuration. The distal spine portion can define a cloverleaf structure disposed radially around the longitudinal axis. The cloverleaf structure can define a central cutout with a central area disposed about the longitudinal axis. The cloverleaf structure can include inner arcs defining a concave perimeter about the longitudinal axis. The atraumatic structure can cover a portion of the cloverleaf structure of the support frame so that only the inner arcs of the cloverleaf structure are visible.

The end effector can further include a sensor coupled to the atraumatic structure. The end effector can further include a plurality of electrodes coupled to the plurality of spines such that a respective electrode of the plurality of electrodes is coupled to a respective spine of the plurality of spines.

The sensor can be disposed in a distal direction in relation to the distal surface of the support frame in the basket configuration.

The sensor can include a contact force sensor. The sensor can include an electrocardiogram sensor. The sensor can include a position sensor. The position sensor can include an inductive coil. The position sensor can include a magnetic sensor.

The position sensor can include a single-axis sensor with a sensor axis that is coaxial to the longitudinal axis.

The atraumatic structure can include a flex circuit.

The flex circuit can include a circular portion and an elongated portion. The circular portion can cover the distal surface of the support frame, thereby forming an atraumatic cover over the distal surface of the support frame. The elongated portion can extend proximally along a spine of the plurality of spines.

The single-axis sensor can include a spiral conductor embedded in the circular portion of the flex circuit.

The support frame can include a distal structure joining the spines and defining a central cutout with a central area disposed about the longitudinal axis. The atraumatic structure can cover at least a portion of the central cutout.

The distal structure can include sinusoidal-like member extending from one spine to an adjacent spine in a direction around the longitudinal axis and forming the cloverleaf structure.

The end effector can further include a plurality of jackets over the plurality of spines.

The plurality of jackets extend and over a majority of the cloverleaf structure such that the atraumatic structure comprises a respective distal portion of each jacket of the plurality of jackets.

The inner arcs extend from distal ends of the plurality of jackets and between adjacent jackets of the plurality of jackets.

The end effector can further include a plurality of electrodes positioned in pairs such that each spine comprises a respective electrode pair and such that the electrode pair of a spine does not longitudinally overlap an electrode pair of an adjacent spine.

Each electrode can include a body defining a hollow portion extending through the body of the electrode so that a spine can be inserted into the hollow portion and retained on the spine. Each spine can include a retention member configured to be compressed to allow an electrode to be moved over the retention member. The retention member can be configured to expand to inhibit movement of the electrode along the spine.

The plurality of electrodes can be configured to deliver electrical pulses for irreversible electroporation, the pulses including a peak voltage of at least 900 volts (V).

The plurality of spines can be configured to form an approximately spherically-shaped basket assembly when in the basket configuration.

The plurality of spines can be configured to form an approximately oblate-spheroid basket assembly when in the basket configuration.

Another example end effector can include a support frame, an atraumatic structure, a sensor, and a plurality of electrodes. The support frame can include a plurality of spines configured to expand away from a longitudinal axis. The atraumatic structure can be coupled to the plurality of spines at a distal end of the support frame. The sensor can be coupled to the atraumatic structure and positioned distal of the support frame. The plurality of electrodes can be coupled to the plurality of spines such that a respective electrode of the plurality of electrodes is coupled to a respective spine of the plurality of spines.

The atraumatic structure can include a rigid, electrically insulating structure.

The atraumatic structure can be configured to maintain a relative position of spines of the plurality of spines at the distal surface of the support frame.

The position sensor can include a single axis sensor, a two axis sensor, and/or a three axis sensor.

The sensor can include a contact force sensor. The sensor can include an electrocardiogram sensor. The sensor can include a position sensor. The position sensor can include an inductive coil. The position sensor can include a magnetic sensor. The position sensor can include a single-axis sensor with a sensor axis that is coaxial to the longitudinal axis.

Each electrode can have a body defining a hollow portion extending through the body of the electrode so that a spine can be inserted into the hollow portion and retained on the spine.

Each spine can include a retention member configured to be compressed to allow an electrode to be moved over the retention member. The retention member can be configured to expand to inhibit movement of the electrode along the spine.

The plurality of electrodes can be configured to deliver electrical pulses for irreversible electroporation, the pulses including a peak voltage of at least 900 volts (V).

The plurality of spines can be configured to form an approximately spherically-shaped basket assembly when in the basket configuration.

The plurality of spines can be configured to form an approximately oblate-spheroid basket assembly when in the basket configuration.

An example system can include a catheter, at least one magnetic field radiator, and processing circuitry. The catheter can be configured to be inserted into a body-part of a living subject. The catheter can include a shaft and a basket assembly. The shaft can include a first coil-based position sensor disposed approximate a distal end of the shaft. The basket assembly can include a self-expandable support frame and a second coil-based position sensor coupled to a distal end of the self-expandable support frame. The basket assembly can further include a plurality of electrodes coupled to a plurality of spines such that a respective electrode of the plurality of electrodes is coupled to a respective spine of the plurality of spines. The at least one magnetic field radiator can be configured to transmit alternating magnetic fields into a region where the body-part is located. The first and second position sensors can be configured to output respective first and second position signals in response to the transmitted alternating magnetic fields. The processing circuitry can be configured to receive the first and second position signals from the first and second position sensors, compute location and orientation coordinates for the first and second position sensors using a position computation in which the location and orientation coordinates of each of the position sensors are interdependently computed in an iterative manner responsively to the respective received position signals, and subject to a constraint that the first and second position sensors are coaxial, compute a distance between the computed location coordinates of the first position sensor and the computed location coordinates of the second position sensor, and estimate respective positions of the plurality of spines responsively to at least the computed distance.

Another example system can include a catheter, at least one magnetic field radiator, and processing circuitry. The catheter can be configured to be inserted into a body-part of a living subject. The catheter can include a shaft and a basket assembly. The shaft can include a first coil-based position sensor disposed approximate a distal end of the shaft. The basket assembly can include a self-expandable support frame and a second coil-based position sensor coupled to a distal end of the self-expandable support frame. The basket assembly can further include a plurality of electrodes coupled to a plurality of spines such that a respective electrode of the plurality of electrodes is coupled to a respective spine of the plurality of spines. The at least one magnetic field radiator can be configured to transmit alternating magnetic fields into a region where the body-part is located. The first and second position sensors can be configured to output respective first and second position signals in response to the transmitted alternating magnetic fields. The processing circuitry configured to receive the first and second position signals from the first and second position sensors, compute a distance and a relative orientation angle between the first and second position sensors responsively to the received position signals, and estimate respective positions of the plurality of spines responsively to at least the computed distance and relative orientation angle, while accounting for a distortion of one or more of the plurality of spines from a symmetrical disposition when the relative orientation angle has a value greater than zero.

The second coil-based position sensor can be disposed in a distal direction in relation to a distal surface of the self-expandable support frame.

An example method can include the following steps executed in a variety of orders and can include additional steps as understood by a person skilled in the art. The method can include inserting a catheter into a body-part of a living subject. The catheter can include a shaft and a basket assembly. A first coil-based position sensor can be disposed at a distal end of the shaft. The basket assembly can include a self-expandable support frame and a second coil-based position sensor coupled to a distal end of the self-expandable support frame. The basket assembly can further include a plurality of electrodes coupled to a plurality of spines such that a respective electrode of the plurality of electrodes is coupled to a respective spine of the plurality of spines. The method can further include unsheathing the basket assembly to allow the self-expandable support frame to form a basket shape. The method can further include transmitting alternating magnetic fields into a region where the body-part is located. The method can further include outputting by the first and second position sensors respective first and second position signals in response to the transmitted alternating magnetic fields. The method can further include receiving the first and second position signals from the first and second position sensors. The method can further include computing location and orientation coordinates for the first and second position sensors using a position computation in which the location and orientation coordinates of each of the position sensors are interdependently computed in an iterative manner responsively to the respective received position signals, and subject to a constraint that the first and second position sensors are coaxial. The method can further include computing a distance between the computed location coordinates of the first position sensor and the computed location coordinates of the second position sensor. The method can further include estimating respective positions of the plurality of spines responsively to at least the computed distance.

Another example method can include the following steps executed in a variety of orders and can include additional steps as understood by a person skilled in the art. The method can include inserting a catheter into a body-part of a living subject. The catheter can include a shaft and a basket assembly. A first coil-based position sensor can be disposed at a distal end of the shaft. The basket assembly can include a self-expandable support frame and a second coil-based position sensor coupled to a distal end of the self-expandable support frame. The basket assembly can further include a plurality of electrodes coupled to a plurality of spines such that a respective electrode of the plurality of electrodes is coupled to a respective spine of the plurality of spines. The method can further include unsheathing the basket assembly to allow the self-expandable support frame to form a basket shape. The method can include transmitting alternating magnetic fields into a region where the body-part is located. The method can include outputting by the first and second position sensors respective first and second position signals in response to the transmitted alternating magnetic fields. The method can include receiving the first and second position signals from the first and second position sensors. The method can include computing a distance and a relative orientation angle between the first and second position sensors responsively to the received position signals. The method can include estimating respective positions of the plurality of spines responsively to at least the computed distance and relative orientation angle, while accounting for a distortion of one or more of the plurality of spines from a symmetrical disposition when the relative orientation angle has a value greater than zero.

An example method of constructing a medical probe can include the following steps executed in a variety of orders and can include additional steps as understood by a person skilled in the art. The method can include forming a support frame including a plurality of spines. The method can include configuring the plurality of spines to be positioned around a longitudinal axis and self-expandable away from the longitudinal axis. The method can include covering a distal surface of the support frame with an atraumatic structure. The method can include coupling a sensor to the atraumatic structure. The method can include coupling a plurality of electrodes to the plurality of spines such that a respective electrode of the plurality of electrodes is coupled to a respective spine of the plurality of spines.

The support frame can include a distal structure joining the spines and defining a central cutout with a central area disposed about the longitudinal axis. The central cutout can define an opening in the distal surface of the support frame.

Forming the support frame from the plurality of spines can include cutting a tube such that the distal structure circumscribes the tube and the plurality of spines extend longitudinally along the tube.

The method can include coupling distal portions of the plurality of spines with the atraumatic structure.

The sensor can be embedded in the atraumatic structure.

Another example method of constructing a medical probe can include the following steps executed in a variety of orders and can include additional steps as understood by a person skilled in the art. The method can include inserting a plurality of spines into a plurality of jackets such that the plurality of spines extend along the longitudinal axis from a proximal central proximal spine portion to a distal spine portion. The distal spine portion can define a cloverleaf structure disposed radially around the longitudinal axis. The cloverleaf structure can define a central cutout with a central area disposed about the longitudinal axis. The plurality of jackets can each cover a majority of the distal spine portion. The method can further include aligning the plurality of spines with a plurality of electrodes each having a lumen extending through the body of the electrode. The method can further include inserting each spine of the plurality of spines into the lumen of an electrode of the plurality of electrodes. The method can further include retaining the plurality of electrodes on the plurality of spines.

Retaining the plurality of electrodes on the plurality of spines can include retaining an electrode of the plurality of electrodes with at least one biasing member.

The at least one biasing member can be disposed outside of the lumen of the electrode.

The at least one biasing member can be disposed inside the lumen of the electrode.

The method can further include positioning a wire through the lumen of an electrically insulative jacket of the plurality of electrically insulative jackets. The method can further include positioning an electrode of the plurality of electrodes over the electrically insulative jacket. The method can further include electrically connecting the wire to the electrode through an aperture in the electrically insulative jacket.

Each respective spine of a plurality of spines can include a first electrode and a second electrode. The method can further include aligning each respective spine of the plurality of spines with the first electrode and the second electrode. The method can further include inserting each respective spine of the plurality of spines into a lumen of the first electrode and a lumen of the second electrode. The method can further include fitting an end of each respective spine of the plurality of spines to the tubular shaft sized to traverse vasculature.

The method can further include offsetting the electrodes between adjacent spines along the longitudinal axis.

The electrode body lumen can be configured to receive the wire of the medical probe.

The wire can be insulated from the spine.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 4A is a perspective view of the distal end of the basket illustrated in FIG. 2A to illustrate concavity of the distal end.

FIG. 4B is a side view of the distal end of the basket illustrated in FIG. 2A to illustrate concavity of the distal end.

DETAILED DESCRIPTION

Figure 1:
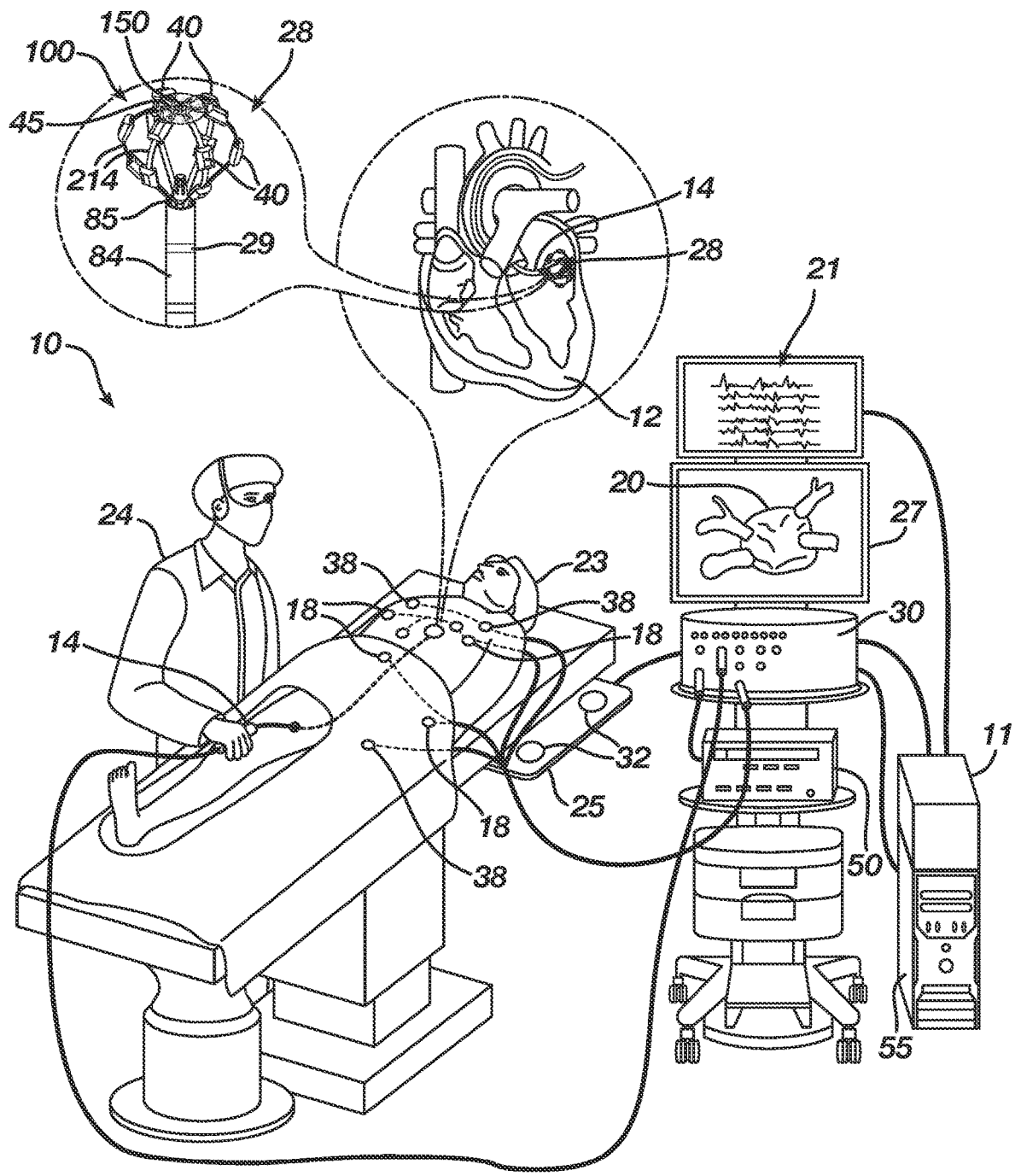
FIG. 1 is an illustration of an example catheter-based electrophysiology mapping and ablation system according to aspects of the present invention.

The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values±20% of the recited value, e.g. "about 90%" may refer to the range of values from 71% to 110%.

As used herein, the terms "patient," "host," "user," and "subject" refer to any human or animal subject and are not intended to limit the systems or methods to human use, although use of the subject invention in a human patient represents a preferred embodiment. In addition, vasculature of a "patient," "host," "user," and "subject" can be vasculature of a human or any animal. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example.

As used herein, the term "proximal" indicates a location closer to the operator or physician whereas "distal" indicates a location further away to the operator or physician.

As used herein, "operator" can include a doctor, surgeon, technician, scientist, or any other individual or delivery instrumentation associated with delivery of a multi-electrode catheter for the treatment of drug refractory atrial fibrillation to a subject.

As used herein, the term "ablate" or "ablation", as it relates to the devices and corresponding systems of this disclosure, refers to components and structural features configured to reduce or prevent the generation of erratic cardiac signals in the cells by utilizing non-thermal energy, such as irreversible electroporation (IRE), referred throughout this disclosure interchangeably as pulsed electric field (PEF) and pulsed field ablation (PFA). Ablating or ablation as it relates to the devices and corresponding systems of this disclosure is used throughout this disclosure in reference to non-thermal ablation of cardiac tissue for certain conditions including, but not limited to, arrhythmias, atrial flutter ablation, pulmonary vein isolation, supraventricular tachycardia ablation, and ventricular tachycardia ablation. The term "ablate" or "ablation" also includes known methods, devices, and systems to achieve various forms of bodily tissue ablation, including thermal ablation, as understood by a person skilled in the relevant art.

As discussed herein, the terms "bipolar", "unipolar", and "monopolar" when used to refer to ablation schemes describe ablation schemes which differ with respect to electrical current path and electric field distribution. "Bipolar" refers to ablation scheme utilizing a current path between two electrodes that are both positioned at a treatment site; current density and electric flux density is typically approximately equal at each of the two electrodes. "Unipolar" and "monopolar" are used interchangeably herein to refer to ablation scheme utilizing a current path between two electrodes where one electrode including a high current density and high electric flux density is positioned at a treatment site, and a second electrode including comparatively lower current density and lower electric flux density is positioned remotely from the treatment site.

As discussed herein, the terms "tubular" and "tube" are to be construed broadly and are not limited to a structure that is a right cylinder or strictly circumferential in cross-section or of a uniform cross-section throughout its length. For example, the tubular structures are generally illustrated as a substantially right cylindrical structure. However, the tubular structures may have a tapered or curved outer surface without departing from the scope of the present disclosure.

Any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those skilled in the pertinent art in view of the teachings herein. Such modifications and variations are intended to be included within the scope of the claims.

FIG. 1 is an illustration showing an example catheter-based electrophysiology mapping and ablation system 10. The system 10 includes multiple catheters, which are percutaneously inserted by a physician 24 through the patient's vascular system into a chamber or vascular structure of a heart 12. Typically, a delivery sheath catheter is inserted into the left or right atrium near a desired location in the heart 12. Thereafter, a plurality of catheters can be inserted into the delivery sheath catheter so as to arrive at the desired location. The plurality of catheters may include catheters dedicated for sensing Intracardiac Electrogram (IEGM) signals, catheters dedicated for ablating and/or catheters dedicated for both sensing and ablating. An example catheter 14 that is configured for sensing IEGM and ablation is illustrated herein. The physician 24 brings a distal tip 28 of the catheter 14 into contact with the heart wall for sensing a target site in the heart 12.

The illustrated catheter 14 is an exemplary catheter that includes one and preferably multiple electrodes 40 optionally distributed over a plurality of spines 214 of a basket assembly 100 at distal tip 28 of the catheter 14 and extending distally from a distal end 85 of a catheter shaft 84. The basket assembly 100 can be configured to sense the IEGM signals and/or provide ablation signals. The catheter 14 may delivered through a sheath or intermediate catheter (not illustrated) to the heart 12. The catheter 14 may additionally include a position sensor 29 embedded in or near distal tip 28 for tracking position and orientation of distal tip 28. Optionally and preferably, position sensor 29 is a magnetic based position sensor including three magnetic coils for sensing three-dimensional (3D) position and orientation. The position sensor 29 is illustrated on a distal portion of the catheter shaft 84, in a proximal direction of the basket assembly 100. Additionally, or alternatively, the basket assembly 100 can include a similarly configured position sensor at a distal end of the basket assembly 100. The illustrated basket assembly 100 includes an atraumatic structure 45 over distal portions of the spines 214. A position sensor, or other type of sensor such as a contact force sensor or electrocardiogram sensor, can be coupled to the atraumatic structure 45. The atraumatic structure 45 can allow the distal end of the basket assembly 100 to be pressed to tissue without damaging tissue.

One or more magnetic based position sensor(s) (e.g. position sensor 29 coupled to shaft 84 and/or position sensor coupled to distal end of basket assembly 100) may be operated together with a location pad 25 including a plurality of magnetic coils 32 configured to generate magnetic fields in a predefined working volume. Real time position of the distal tip 28 of the catheter 14 may be tracked based on magnetic fields generated with a location pad 25 and sensed by the magnetic based position sensor(s). Details of the magnetic based position sensing technology are described in U.S. Pat. Nos. 5,391,199; 5,443,489; 5,558,091; 6,172,499; 6,239,724; 6,332,089; 6,484,118; 6,618,612; 6,690,963; 6,788,967; and 6,892,091 incorporated by reference herein and attached in the Appendix of priority Patent Application No. 63/477,425.

The system 10 includes one or more electrode patches 38 positioned for skin contact on the patient 23 to establish location reference for location pad 25 as well as impedance-based tracking of electrodes 40 and/or an impedance-based sensor at the distal end of the basket assembly 100. For impedance-based tracking, electrical current is directed toward electrodes 40 (and/or sensor at distal end of basket assembly 100) and sensed at electrode skin patches 38 so that the location of each electrode and/or sensor can be triangulated via the electrode patches 38. Details of the impedance-based location tracking technology are described in U.S. Pat. Nos. 7,536,218; 7,756,576; 7,848,787; 7,869,865; and 8,456,182 incorporated by reference herein and attached in the Appendix of priority Patent Application No. 63/477,425.

A recorder 11 displays electrograms 21 captured with body surface ECG electrodes 18 and intracardiac electrograms (IEGM) captured with electrodes 40 of the catheter 14 and/or a sensor at a distal end of the basket assembly 100. The recorder 11 may include pacing capability for pacing the heart rhythm and/or may be electrically connected to a standalone pacer.

The system 10 can include an ablation energy generator 50 that is adapted to conduct ablative energy to one or more of electrodes 40 of the basket assembly 100 configured for ablating. Energy produced by the ablation energy generator 50 may include, but is not limited to, radiofrequency (RF) energy or pulsed-field ablation (PFA) energy, including monopolar or bipolar high-voltage DC pulses as may be used to effect irreversible electroporation (IRE), or combinations thereof.

A patient interface unit (PIU) 30 is an interface configured to establish electrical communication between catheters, electrophysiological equipment, power supply and a workstation 55 for controlling operation of system 10. Electrophysiological equipment of the system 10 may include for example, multiple catheters, a location pad 25, body surface ECG electrodes 18, electrode patches 38, an ablation energy generator 50, and a recorder 11. Optionally and preferably, the PIU 30 includes processing capability for implementing real-time computations of location of the catheters and for performing ECG calculations.

The workstation 55 includes memory, processor unit with memory or storage with appropriate operating software loaded therein, and user interface capability. The workstation 55 can be configured to provide multiple functions, optionally including (1) modeling the endocardial anatomy in three-dimensions (3D) and rendering the model or an anatomical map 20 for display on a display device 27; (2) displaying on the display device 27 activation sequences (or other data) compiled from recorded electrograms 21 in representative visual indicia or imagery superimposed on the rendered anatomical map 20; (3) displaying real-time location and orientation of multiple catheters within the heart chamber; and (4) displaying on the display device 27 sites of interest such as places where ablation energy has been applied. One commercial product embodying elements of the system 10 is available as the CARTO™ 3 System, available from Biosense Webster, Inc., 31 Technology Drive, Suite 200, Irvine, CA 92618, USA.

The system 10 can further include an irrigation fluid system, and the workstation 55 can further be configured to deliver irrigation fluid to the catheter 14.

Figure 2A:
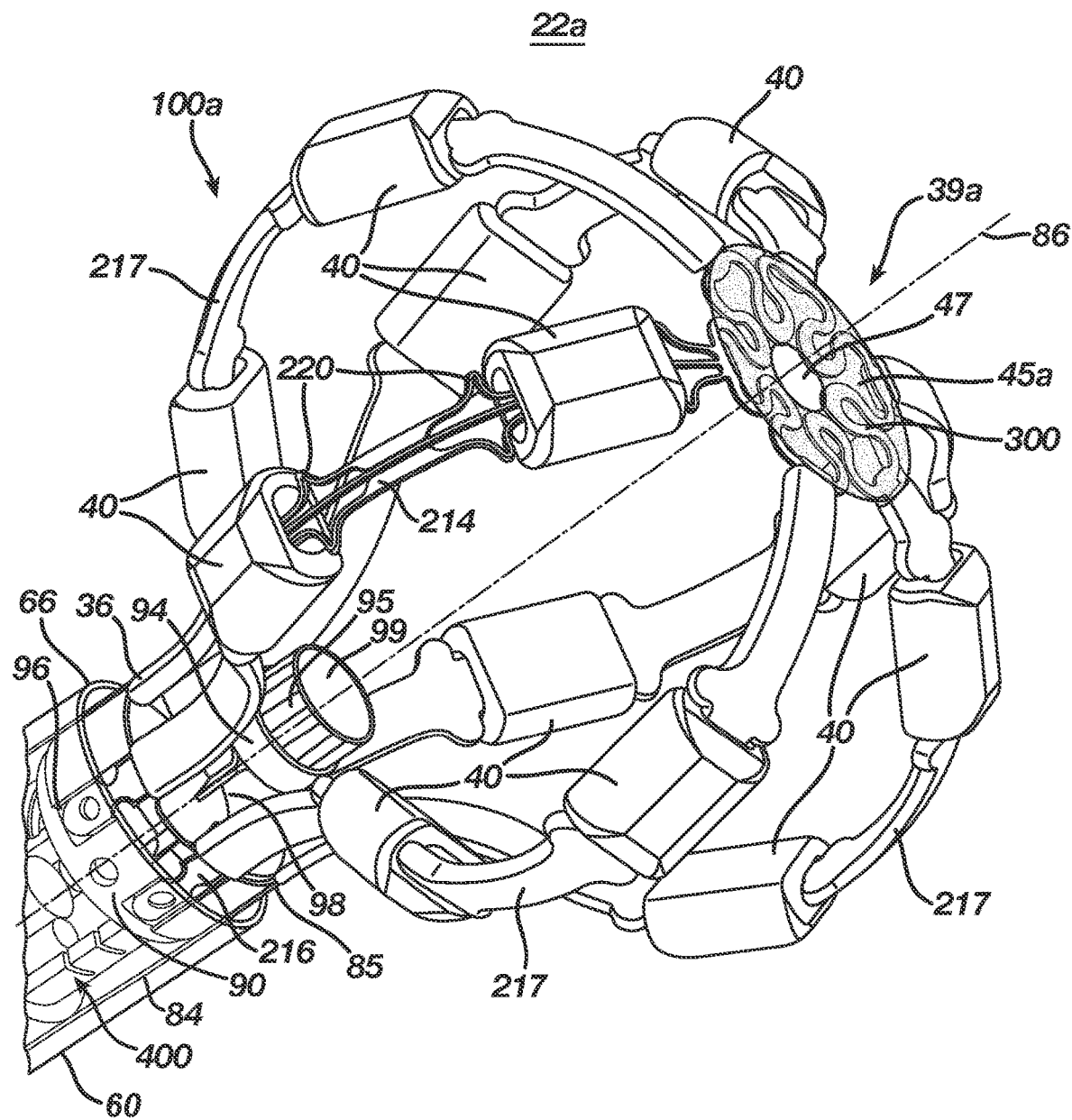
FIG. 2A is a perspective view of a medical probe in an expanded form according to aspects of the present invention.

FIG. 2A is an illustration of a perspective view of a medical probe 22a including a basket assembly 100a in an expanded form when unconstrained. The medical probe 22a can be used in place of catheter 14 illustrated in FIG. 1. A distal portion of a sheath can include an insertion tube 60 (illustrated as transparent). The basket assembly 100a can traverse a lumen of the insertion tube 60 in a collapsed state, and can expand to the expanded form as illustrated when advanced out of a distal end 66 of the insertion tube 60. The basket assembly 100a can be self-expandable such that the spines 214 expand away from the longitudinal axis 86 upon exiting the insertion tube 60 without requiring an additional mechanism, such as a pusher tube or a puller wire, to cause the basket assembly 100a to expand to the expanded form. The spines 214 form a support frame of the basket assembly 100a that provides significant structural and mechanical functionality of the basket assembly 100a.

Probe 22a may include a contact force sensor 400 to determine contact force of the spines 214 against cardiac tissues. Details of the contact force sensor 400 are shown and described in US Patent Application Publication No. US2021/0077180A1 published Mar. 18, 2021, which disclosure is incorporated by reference herein.

In the expanded form, spines 214 bow radially outwardly and in the collapsed form (not shown) the spines 214 are arranged generally along a longitudinal axis 86 of insertion tube 60. The basket assembly 100a includes a plurality of electrically insulative jackets 217 over each spine 214 so that the jackets 217 are disposed between a respective spine 214 and a respective electrode 40, thereby electrically isolating the electrodes 40 from the spines 214. A portion of a jacket 217 is omitted over one of the spines 214 in the illustration of FIG. 2A for the sake of illustration, and the basket assembly 100a preferably includes a jacket 217 over every spine 214. Each electrode 40 can be located substantially in place with respect to spine 214 by way of a retention member 220 formed integrally with the spine 214.

The spines 214 can be connected at both ends of the basket assembly 100a. During a medical procedure, medical professional 24 can deploy basket assembly 100a by extending tubular shaft 84 from insertion tube 60 causing basket assembly 100a to exit insertion tube 60 and transition to the expanded form. Spines 214 may have a circular or elliptical cross-section, a square or rectangular cross-section, or other cross-sectional shape. The cross-sectional shape may appear to be flat. The spines 214 may include a flexible, resilient material e.g., a shape-memory alloy such as nickel-titanium, also known as Nitinol. The basket assembly 100a has a proximal portion 36 and a distal portion 39a. The distal portion 39a of the support frame includes a distal structure 300 resembling a cloverleaf and hence structure 300 will be referred hereafter as a "cloverleaf structure". The spines 214 extend along the longitudinal axis 86 from a proximal spine portion 216 to a distal spine portion that includes the cloverleaf structure 300. The cloverleaf structure 300 is disposed radially around the longitudinal axis 86. The cloverleaf structure 300 defines a central cutout with a central area disposed about the longitudinal axis.

Preferably, the spines 214 can be made from nitinol, cobalt chromium, stainless steel, titanium, and combinations or alloys thereof. Each electrode 40 can be made of stainless steel, cobalt chromium, gold, platinum, palladium, and alloys hereof.

The medical probe 22a can include a spine retention hub 90 that extends longitudinally from a distal end of tubular shaft 84 towards the distal portion 39a of basket assembly 100a. The spine retention hub 90 can be inserted into the tubular shaft 84 and attached to the tubular shaft 84. Spine retention hub 90 can include a cylindrical member 94 including a plurality of relief lands 96, multiple irrigation openings 98 to allow outflow of irrigation fluid into a volume defined by the basket spines, and hub end 99. The workstation 55 can include an irrigation module that delivers irrigation fluid to basket assembly 100a through tubular shaft 84 and out irrigation openings 98 of the spine retention hub 90. Relief lands 96 can be disposed on the outer surface of cylindrical member 94 and configured to allow a portion of each spine 214, such as each spine attachment end 216, to be fitted into a respective relief land 96 of retention hub 90 also known as a coupler for a contact force sensor 400. The attachment end 216 can be a generally linear end of the spine 214. The attachment end 216 can be configured to extend outwardly from the spine retention hub 90 such that the basket assembly 100a is positioned outwardly from the spine retention hub 90 and, consequently, outwardly from the tubular shaft 84. In this way, the spine 214 can be configured to position the basket assembly 100a distally from the distal end of the tubular shaft 84 and distal from the distal end of the insertion tube 60 when the basket assembly 100a is deployed. Reference electrode 95 can be disposed on the cylindrical member 94 or on the hub end surface 99. It should be noted that hub 90 in effect can have multiple functions: (1) to retain the spine legs proximally; (2) allow hub 90 (as well as the basket assembly 100a) to be connected to distal tube 84; (3) to function as a fluid diverter for irrigation fluid delivered through distal tube 84; and (4) provide a reference electrode 95.

The basket assembly 100a includes an atraumatic distal cover 45a. The atraumatic distal cover 45a can be configured to reduce likelihood of tissue damage due to pressure of the distal portion 39a of the basket assembly 100a against tissue. The atraumatic distal cover 45a covers a majority of the cloverleaf structure 300. The atraumatic distal cover 45a can be applied to the distal spine portion in alternative configurations of basket assembly 100a as understood by one skilled in the art to reduce likelihood of tissue damage due to pressure of the distal portion 39a of the basket assembly 100a against tissue. The atraumatic distal cover 45a may be particularly suited for basket assembly structures having struts or structures with edges positioned at the distal end of the basket assembly. The atraumatic distal cover 45a can include a central opening 47 about the longitudinal axis 86. The atraumatic distal cover 45a can include a flex circuit with a sensor. Additionally, or alternatively, the atraumatic distal cover 45a can be constructed by dip coating the cloverleaf structure 300.

Figure 2B:
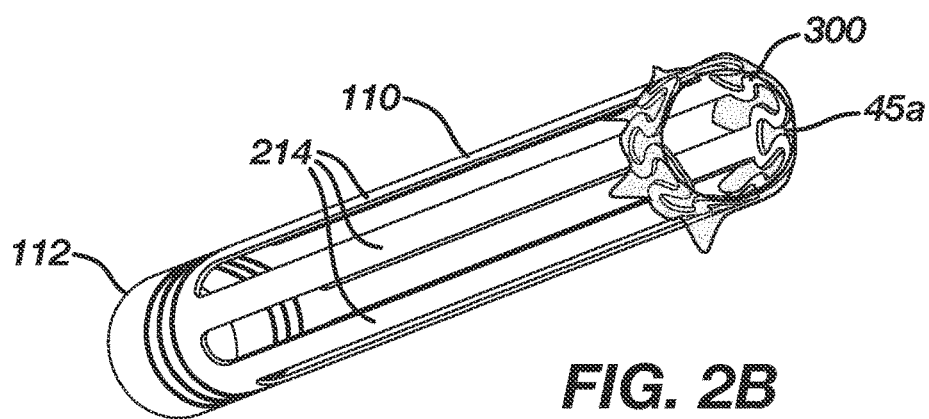
FIG. 2B is an illustration of a tubular frame of a medical probe formed from a tube stock according to aspects of the present invention.

FIG. 2B is an illustration of a tubular frame 110 of a medical probe formed from a tube stock. The tubular frame includes spines 214 joined at a distal spine portion by a cloverleaf structure 300 and joined at a proximal spine portion by a proximal ring 112. The tubular frame 110 can be used in place of the spines 214 illustrated in FIG. 2A with modification to the retention hub 90 to accept the proximal ring 112. Further the spines 214 of the tubular frame 110 can be modified to include features of the spines 214 illustrated in FIG. 2A. It is also within the scope of this invention for the spines 214 to be formed form a flat sheet stock, cut and heat treated to achieve the spheroidal basket shape shown in FIG. 2A. The tubular frame 110 FIG. 2B can be compressed longitudinally and the spines 214 can expand radially to form the basket shape spine structure similar to as illustrated in FIG. 2A. Likewise the spines 214 illustrated in FIG. 2A can be collapsed to align longitudinally as illustrated in FIG. 2B. The tubular frame 110 includes an atraumatic distal cover 45a over the cloverleaf structure 300 similar to as illustrated in FIG. 2A. The tubular frame 110 can function as a support frame for a basket assembly similar to the basket assembly 100a illustrated in FIG. 2A.

Figure 2C:
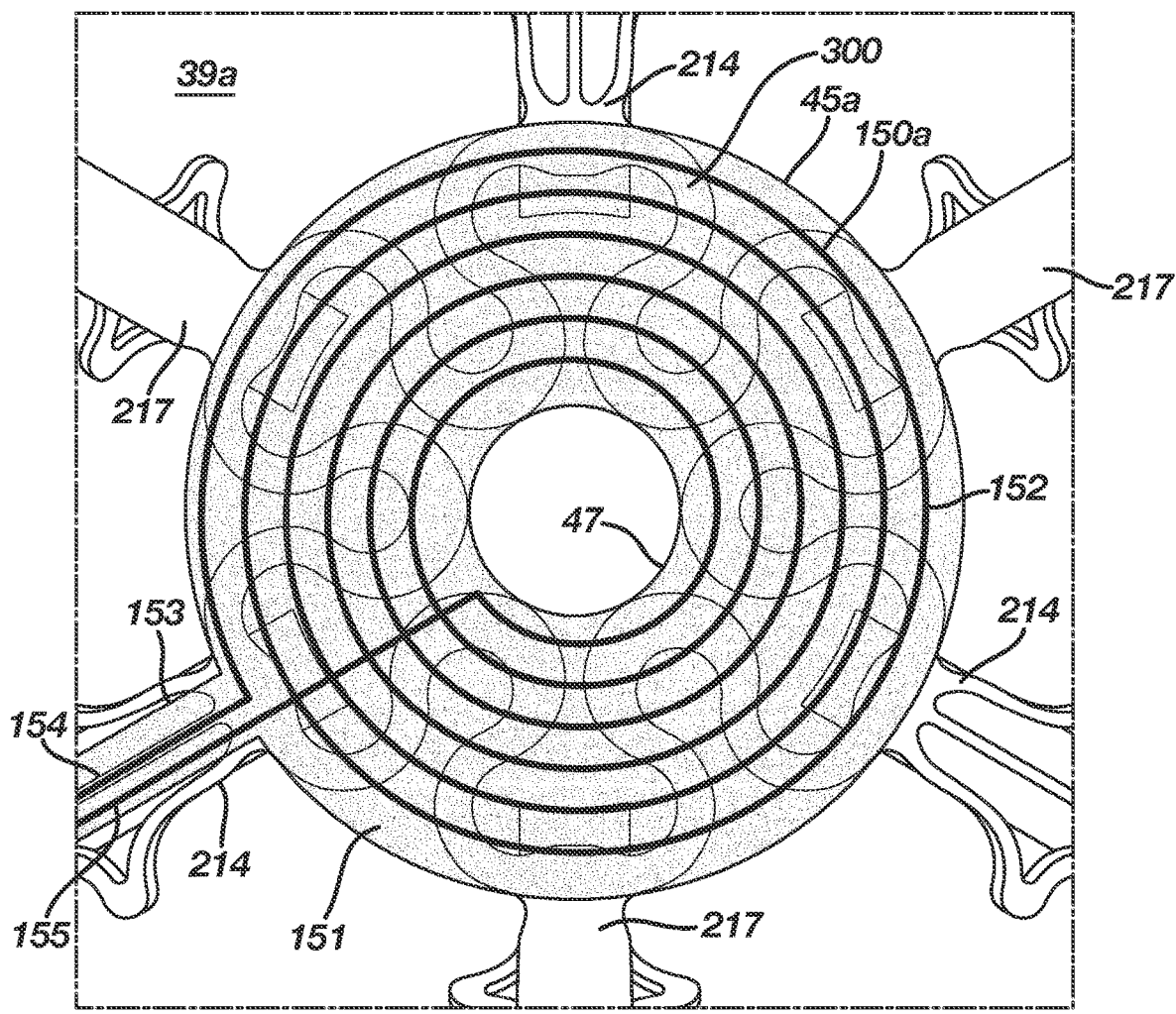
FIG. 2C is an illustration of a distal end view of the basket assembly of FIG. 2A according to aspects of the present invention.

FIG. 2C is an illustration of a distal end view of the basket assembly 100a of FIG. 2A. A sensor 150a can be coupled to the atraumatic distal cover 45a. For instance, the atraumatic distal cover 45a can include a flex circuit, and the sensor 150a can be patterned on the flex circuit. The atraumatic distal cover 45a is positioned over a distal surface of the support frame of the basket assembly 100a.

The sensor 150a can include a contact force sensor, an electrocardiogram sensor, and/or a position sensor. As illustrated, the sensor 150a includes an inductive coil that can function as a single axis magnetic position sensor. The sensor 150a includes a circular portion 151 including a spiral inductor 152 and a linear portion 153 including a first conductive trace 154 from an outer portion of the spiral inductor 152 and a second conductive trace 155 from an inner portion of the spiral inductor 152. The linear portion 153 extends in a proximal direction along a spine 214 to the shaft 84 to provide electrical connection of the distal sensor 150b to the system 10 (FIG. 10). The sensor 150a as illustrated includes only one spiral inductor 152 for the sake of illustration, however, multiple spiral inductors of similar size to the illustrated spiral inductor 152 can be stacked to increase number of turns, and therefore sensor sensitivity, as understood by a person skilled in the art. Jackets 217 are omitted from some of the spines 214 illustrated in FIG. 2C for the sake of illustration. Preferably, each spine 214 includes a jacket 217.

Figure 3A:
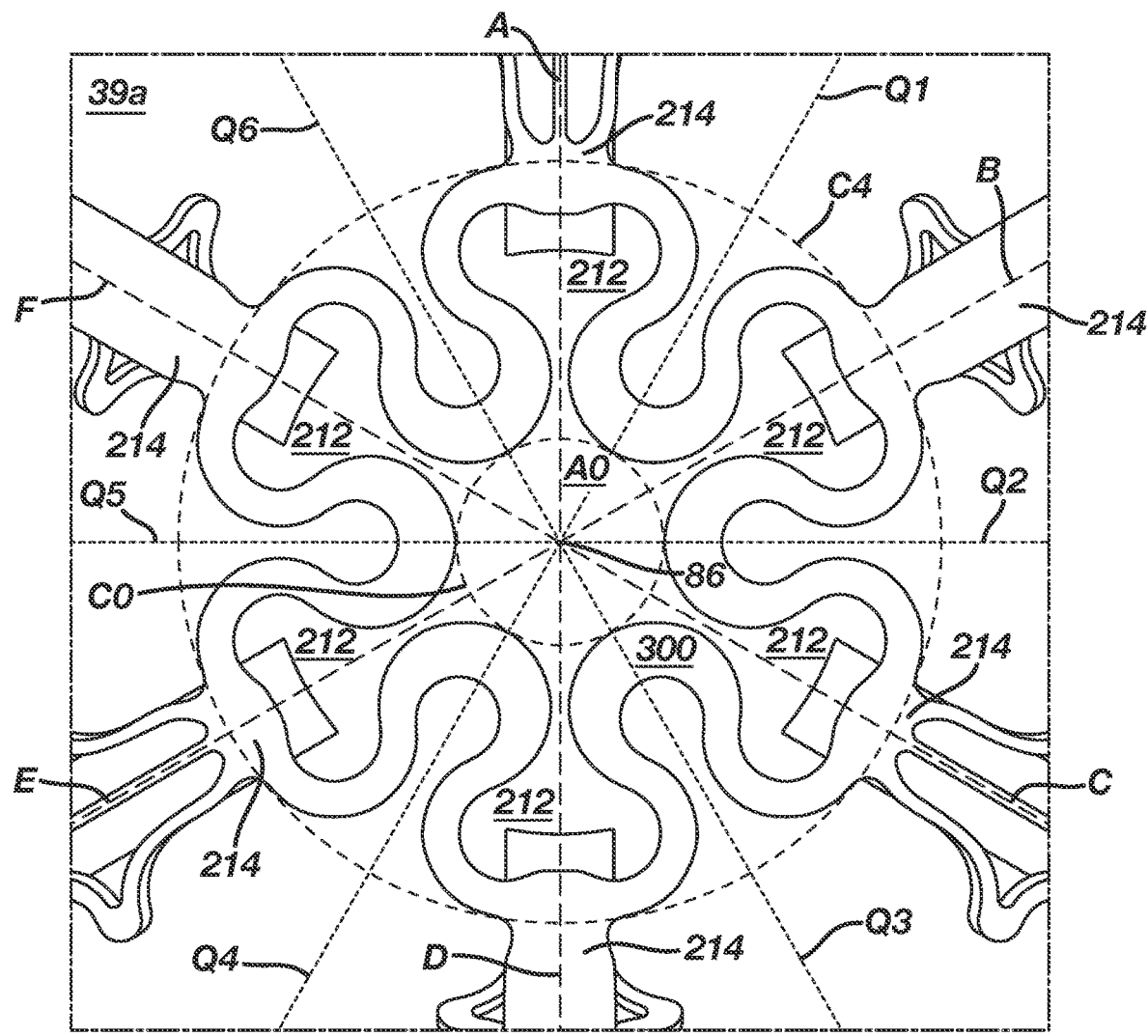
FIG. 3A is another illustration of the distal end view of the basket assembly of FIG. 2A with the atraumatic distal cover omitted from the illustration according to aspects of the present invention.

FIG. 3A is another illustration of a distal end view of a distal surface of the basket assembly 100a of FIG. 2A with the atraumatic distal cover 45a removed for the sake of illustration. The cloverleaf structure 300 is disposed radially around the longitudinal axis 86. The cloverleaf structure 300 includes clover cutouts 212. Each clover cutout 212 is aligned along radial axis A, B, C, D, E, F extending orthogonally from axis 86 so that the plurality of spines 214 extend in an equiangular pattern such that respective angles between respectively adjacent spines are approximately equal. While the preferred embodiment includes six spines, it is within the scope of the invention to have any number of spines from four to twelve.

The cloverleaf structure 300 defines a central cutout CO with a negative or empty area A0 disposed about the longitudinal axis 86. The cloverleaf structure 300 is configured so that a portion of cloverleaf structure 300 is tangential to the central circle CO proximate a location between any two radial axes on which two neighboring spines 214 are located. For example, with spine 214 on radii axis A and neighboring spine 214 on axis B, the cloverleaf structure 300 is tangential to the open circle CO at a location bisecting the two radial axis A and B by a line Q1 connected to the central axis 86. This tangential characteristic of the sinusoidal cloverleaf member 300 around the open area A0 is repeated for any two adjacent spines 214 (e.g. spine 214 on axis B and spine 214 on axis C and so on) for all of the bisecting axes Q1, Q2, Q3, Q4, Q5, Q6. The bisecting axes Q1, Q2, Q3, Q4, Q5, Q6 correspond to peaks of the cloverleaf structure 300 and the radial axes A, B, C, D, E, F correspond to troughs of the cloverleaf structure, wherein peaks of the cloverleaf structure are closer to the central axis 86 and troughs are further from the central axis 86.

Figure 3B:
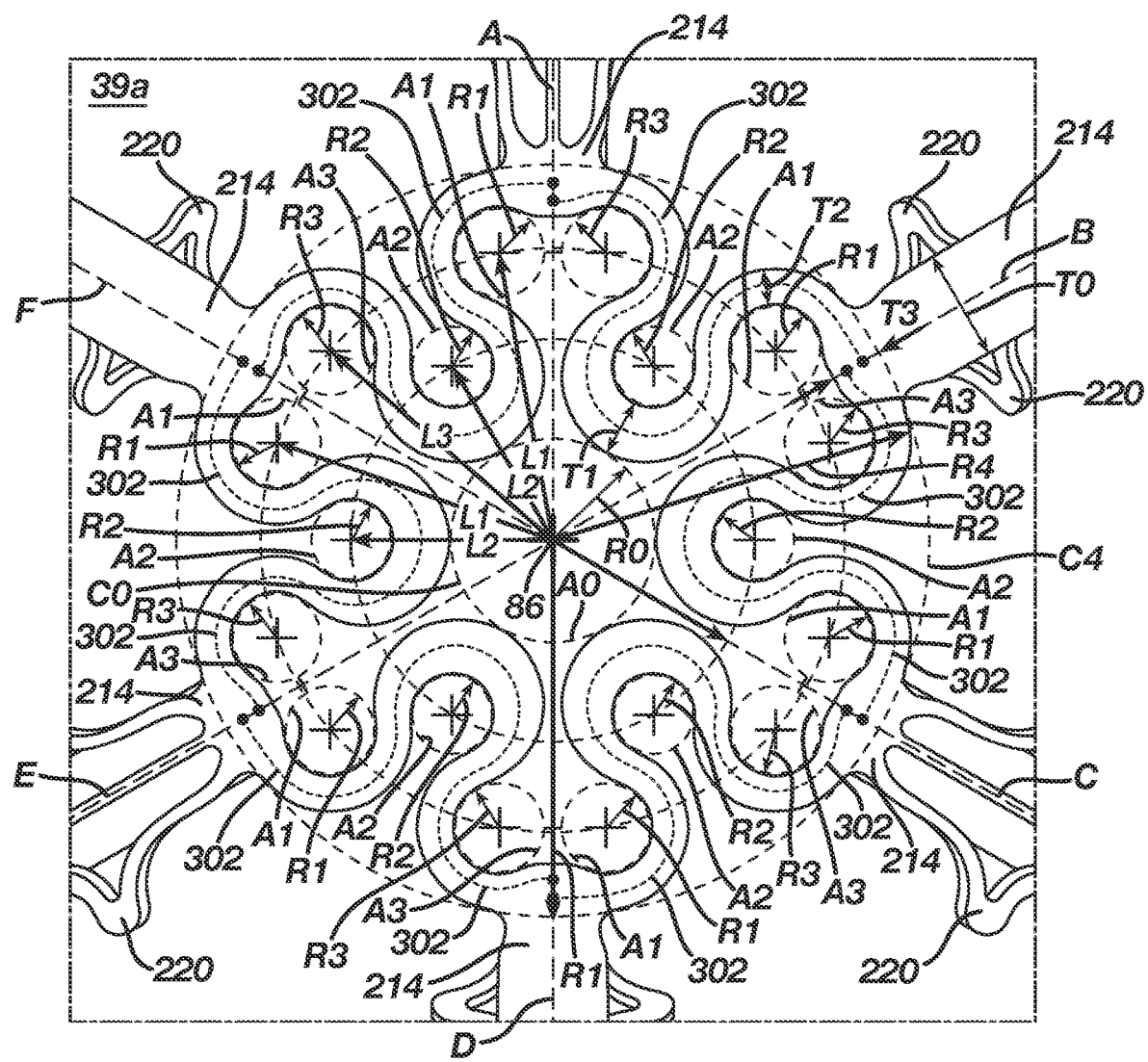
FIG. 3B is another illustration of the distal end view of the basket assembly of FIG. 2A with the atraumatic distal cover omitted from the illustration according to aspects of the present invention.

FIG. 3B illustrates the end view of the basket assembly 100a illustrated in FIG. 2A as if basket assembly 100a is detached from the shaft 84 and the distal portion 39a of the basket assembly 100a is flattened between two sheets of glass. The cloverleaf structure 300 can be sinusoidal-like, extending from one spine 214 to an adjacent spine 214 in a direction e.g., counterclockwise, or clockwise around the longitudinal axis 86. This characteristic of the sinusoidal structure 300 can be seen in FIG. 3B with for example, spine 214 located on radial axis A. Starting from this spine 214 on axis A, the cloverleaf structure 300 is configured so that it meanders as indicated by dashed line forming a sinusoidal-like member 302 around a portion of the cutout 212 having a negative or open first area A1 which can be approximated by circle R1. As used herein, the term "open area" means the absence of any solid structure to define a space that lacks frame material. The "open area" may be covered or at least partially filled with a secondary material such as the atraumatic distal cover 45a. This first open area A1 is approximately 20% that of the central area A0. For convenience, the first open area A1 can be approximated by the first virtual circle R1 that has its center located at a first distance L1 to the longitudinal axis 86. Continuing in FIG. 4B, the sinusoidal cloverleaf member 300 meanders in a counter-clockwise direction from axis A to axis F around a second open area A2 towards an adjacent spine 214 located on axis F. For convenience, the second open area A2 can also be approximated to a second virtual circle R2 having a second open area A2 of approximately 90% of the first open area A1. It is noted that the second virtual circle may have its center of radius R2 located at a second distance L2 smaller than the first distance L1 to the longitudinal axis 86. Continuing towards axis F in FIG. 4B, the sinusoidal cloverleaf member 300 meanders forming a sinusoidal-like member 302 around a third open area A3 which for convenience is approximated by third virtual circle with radius R3. The third virtual circle has its center for radius R3 located at a third distance L3 to the central axis 86 that is greater than L2 and approximately equal to the first distance L1. Once the sinusoidal cloverleaf member 300 crosses axis F, the structural nomenclatures repeat again with another first open area A1 on the other side of axis F closer to axis E on which cloverleaf structure 300 meanders as referenced by dashed line representing the sinusoidal-like member 302 towards next spine 214 located on axis E.

A width T0 of the spine 214 can be from 0.25 to 1 mm while the sinusoidal member 302 has a maximum width T1 of about ½ of the width of T0 with a minimum width T2 of about ⅓ of spine width TO. A width T3 proximate the spine axis (A, B, C, D, E or F) is about the same as the maximum with T1. The central area A0, approximated by radius R0, is approximately 0.8 mm-squared, the fourth virtual circle C4 may have an area approximately 14 times greater than the central area A0. Each of the first and third virtual circle R1 and R3 is located at a first distance L1 of approximately 1.5 mm from the central axis 86 while the second virtual circle R2 is located at a distance L2 of approximately ½ that of the first distance L1.

Figure 3C:
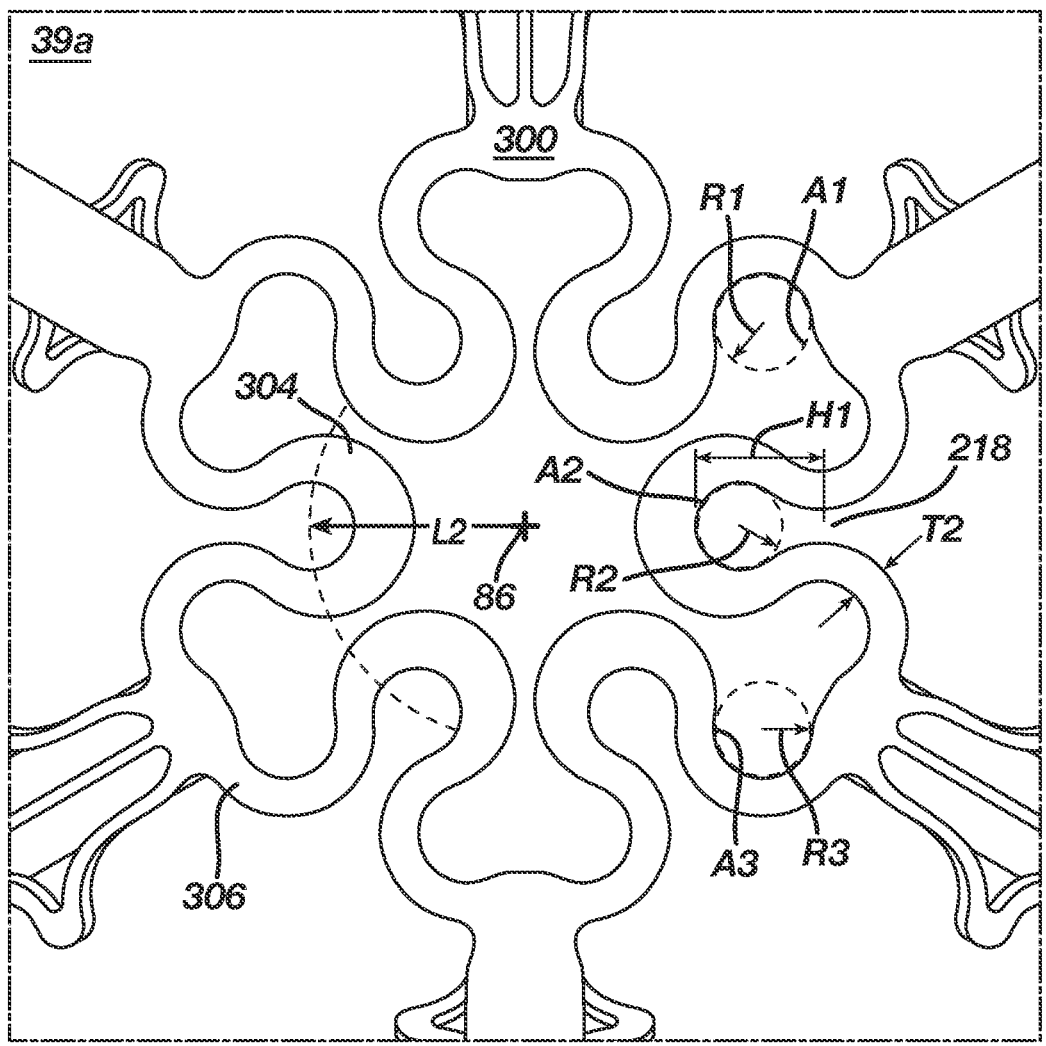
FIG. 3C is another illustration of the distal end view of the basket assembly of FIG. 2A with the atraumatic distal cover omitted from the illustration according to aspects of the present invention.

FIG. 3C illustrates another end view of the basket assembly 100a illustrated in FIG. 2A as if basket assembly 100a is detached from the shaft 84 and the distal portion 39a of the basket assembly 100a is flattened between two sheets of glass. FIG. 3C illustrates selected dimension of the cloverleaf structure 300 which can be tailored to achieve desired mechanical properties of the basket assembly 100a. Radius R1 of the first open area A1, radius R2 of the second open area A2, radius R3 of the third open area A3, and minimum width T2 of the sinusoidal member 302 can each be adjusted to achieve desired mechanical properties. These dimensions are also illustrated in FIG. 3B. Additionally, a height H1 can be adjusted to achieve desired mechanical properties. The height H1 is measured from an innermost point of the second open area A2 to a neck 218 directly radially outward, away from the longitudinal axis L-L, from the second open area A2. The neck 218 is positioned where adjacent proximal portions 306 of the cloverleaf structure 300 are closest to each other.

The second length L2 from the longitudinal axis L-L to the center of the second virtual circle A2 (FIG. 3B) defines a boundary between the inner arcs 304 and the outer portion 306 of the cloverleaf structure 300.

FIG. 4A is a perspective view of the distal portion 39a of the basket assembly 100a illustrated in FIG. 2A to illustrate concavity of the cloverleaf structure 300. Jackets 217 and electrodes 40 are omitted for the sake of illustration.

FIG. 4B is a side view of the distal portion 39a of the basket assembly 100a illustrated in FIG. 2A to illustrate concavity of the cloverleaf structure 300. Jackets 217 and electrodes 40 are omitted for the sake of illustration. The distal portion 39a of the basket assembly 100a can be shaped to have a curvature 305. As illustrated, the cloverleaf structure 300 is bent so that its open center 211 is contiguous to a plane defined by central circle C0 and spaced apart by a gap G with respect to a plane defined by the fourth virtual circle C4 encircling the cloverleaf structure 300. The concavity is indicated by a dashed line of a curvature 305 which can be an arcuate section of a circle.

Figure 5A:
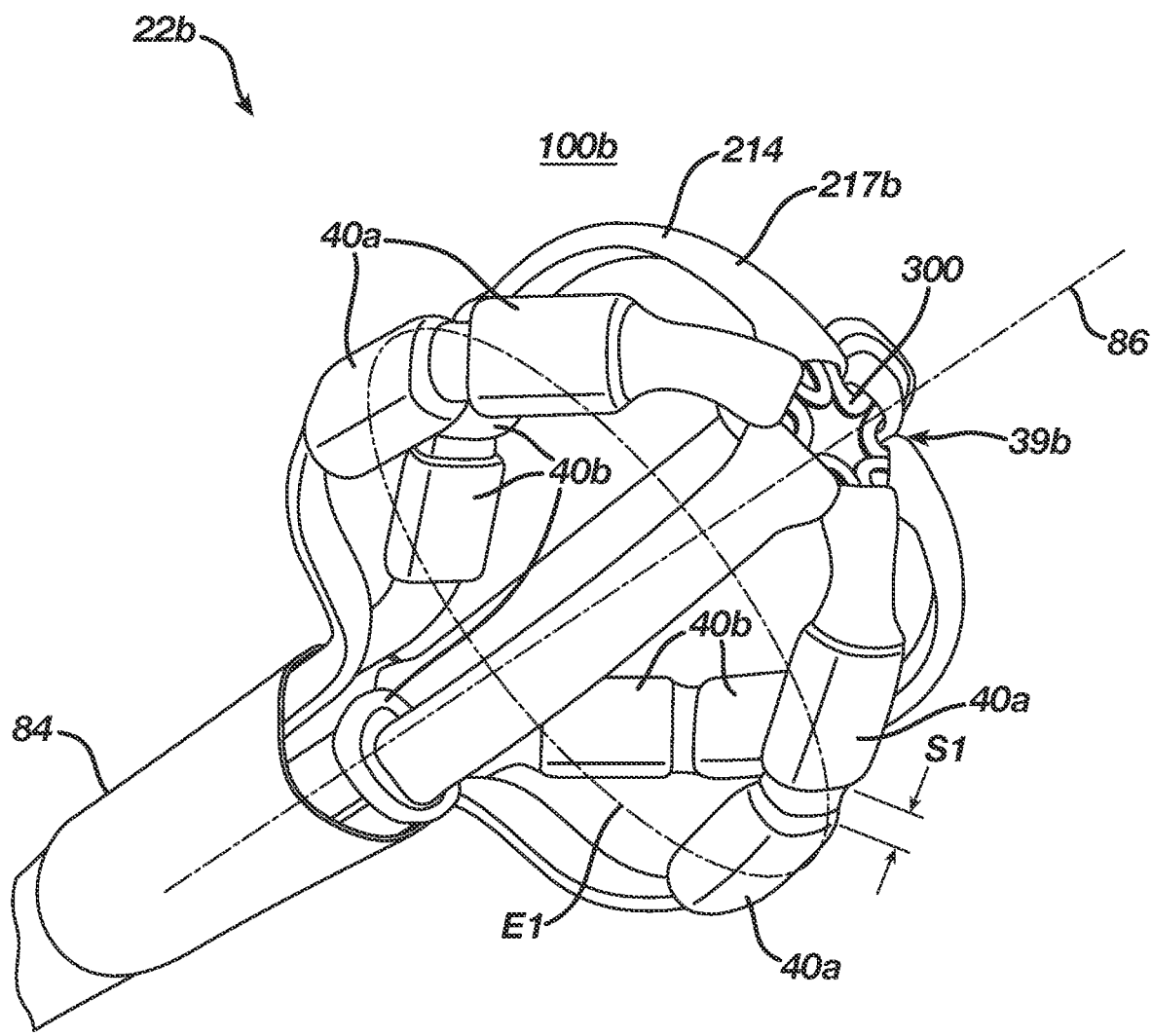
FIG. 5A is a perspective view of another example medical probe in an expanded form according to aspects of the present invention.

FIG. 5A illustrates a perspective view of another example medical probe 22b having an example basket assembly 100b including spines 214 each including a closely spaced electrode pair 40a, 40b and a jacket 217b extending over a proximal portion 306 (FIG. 3C) of the cloverleaf 300. The spines 214 and basket assembly 100b can be otherwise configured similarly to the basket assembly 100a illustrated in FIG. 2A. Electrodes of each electrode pair 40a, 40b have an edge-to-edge spacing S1 between electrodes in the pair. Electrode pairs 40a, 40b are positioned in an alternating pattern with more distally positioned electrode pairs 40a on every other spine 214, and more proximally positioned electrode pairs 40b positioned on every other spine 214. The basket assembly 100b defines an equator E1 perpendicular to the longitudinal axis 86 where the circumference of the basket shape is the greatest. The proximal electrode pairs 40b are entirely proximal of the equator E1. The equator E1 traverses a proximal electrode of each of the distal electrode pairs 40a.

Figure 5B:
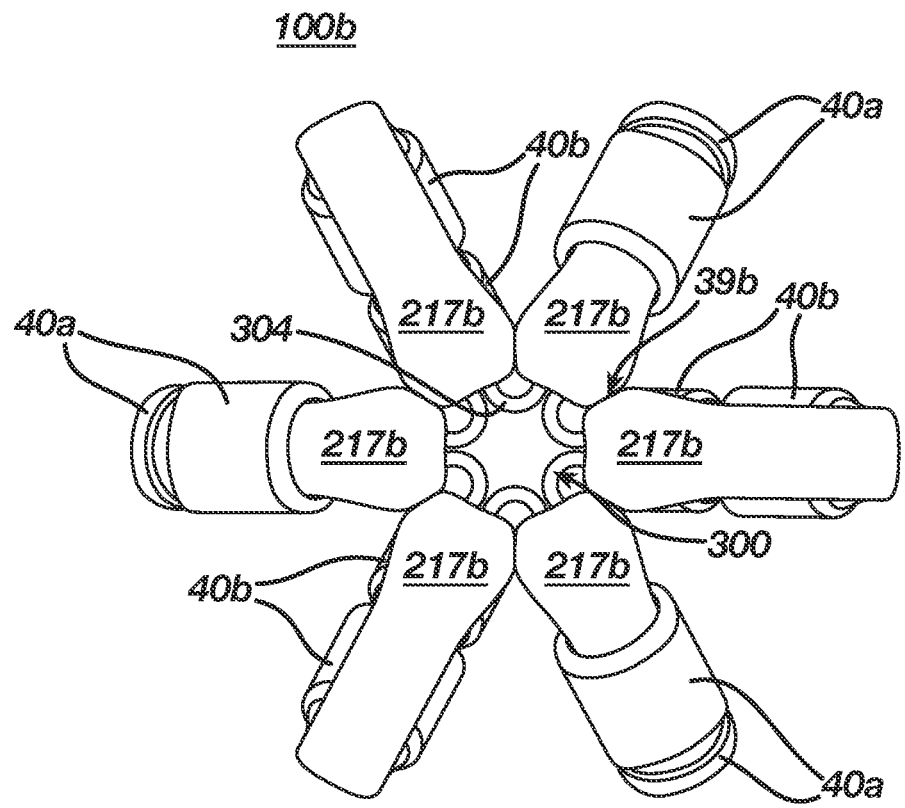
FIG. 5B is a distal end view of medical probe illustrated in FIG. 5A.

FIG. 5B illustrates a distal end view of the basket assembly 100b illustrated in FIG. 5A. Inner arcs 304 of the cloverleaf structure 300 are exposed while the outer portion 306 (FIG. 3C) of the cloverleaf structure 300 is covered by the jackets 217b to provide an atraumatic distal portion 39b of the basket assembly 100b. Distal portions of the jackets 217b, therefore, form an atraumatic structure covering a portion of the cloverleaf structure. The second length L2 from the longitudinal axis L-L to the center of the second virtual circle A2 (FIG. 3B) defines a boundary between the inner arcs 304 and the outer portion 306 of the cloverleaf 300 (FIG. 3C). A majority of each outer portion 306 (FIG. 3C) is covered by a respective jacket 217b. A majority of the inner arcs 304 are exposed to environment. A distal portion of each jacket 217b tapers outward and inward, following the curvatures of the respective proximal portion 306 (FIG. 3C) of the cloverleaf structure 300 covered by the jacket 271a. The distal portions of each jacket 217b abut each other at the distal portion 39b of the basket assembly 100b when the basket assembly is expanded. The distal ends of the jackets 271a can be heat set closed and/or thermally fused. Additionally, or alternatively, a small amount of polymer can be applied to the distal ends of each jacket 217b to seal the jacket 217b to the spine 214.

Figure 5C:
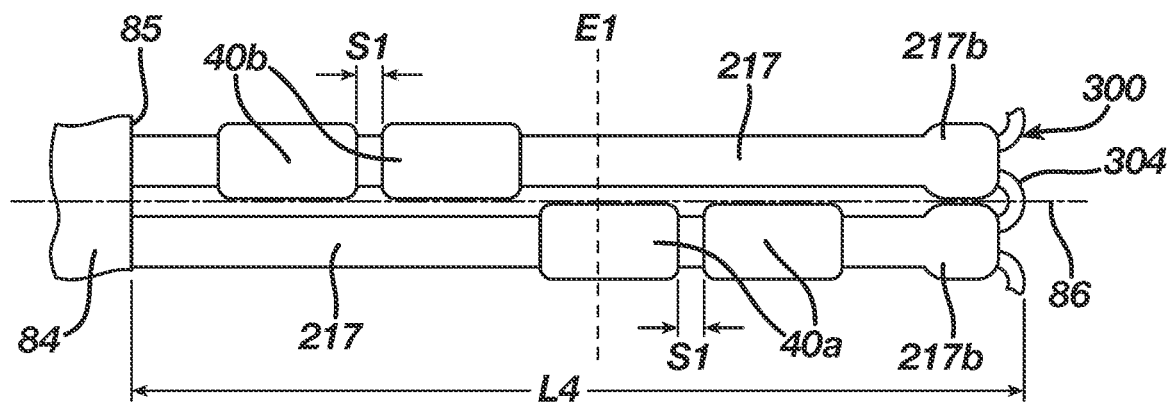
FIG. 5C is a collapsed view of the medical probe illustrated in FIG. 5A.

FIG. 5C illustrates a side view of two adjacent spines 214 of the basket assembly 100b illustrated in FIG. 5A in a collapsed form for delivery. Only two spines 214 are illustrated for the sake of simplicity of illustration. Each spine 214 has a length L4 measured from a distal end 85 of the shaft 84 to a distal end of the cloverleaf 300, at the peak of the distal arc 304. The equator E1 is positioned approximately at a midpoint of the length L4 of the spines 214. The electrode pairs 40a, 40b are positioned such that electrode pairs 40a, 40b on adjacent spines 214 do not overlap along the length L4 of the spine 214. Electrodes of distal electrode pairs 40a are entirely distal of electrodes of the proximal electrode pairs 40b when the basket assembly 38d is collapsed for delivery.

The basket assembly 100b can traverse a lumen of the insertion tube 60 (FIG. 2A) in a collapsed state as illustrated in FIG. 5C, and can expand to the expanded form as illustrated in FIG. 5A when advanced out of a distal end 66 of the insertion tube 60 (FIG. 2A). The basket assembly 100b can be self-expandable such that the spines 214 expand away from the longitudinal axis 86 upon exiting the insertion tube 60 (FIG. 2A) without requiring an additional mechanism, such as a pusher tube or a puller wire, to cause the basket assembly 100b to expand to the expanded form. The spines 214 form a support frame of the basket assembly 100b that provides significant structural and mechanical functionality of the basket assembly 100b. The spines 214 form a support frame of the basket assembly 100b that provides significant structural and mechanical functionality of the basket assembly 100b.

Figure 6A:
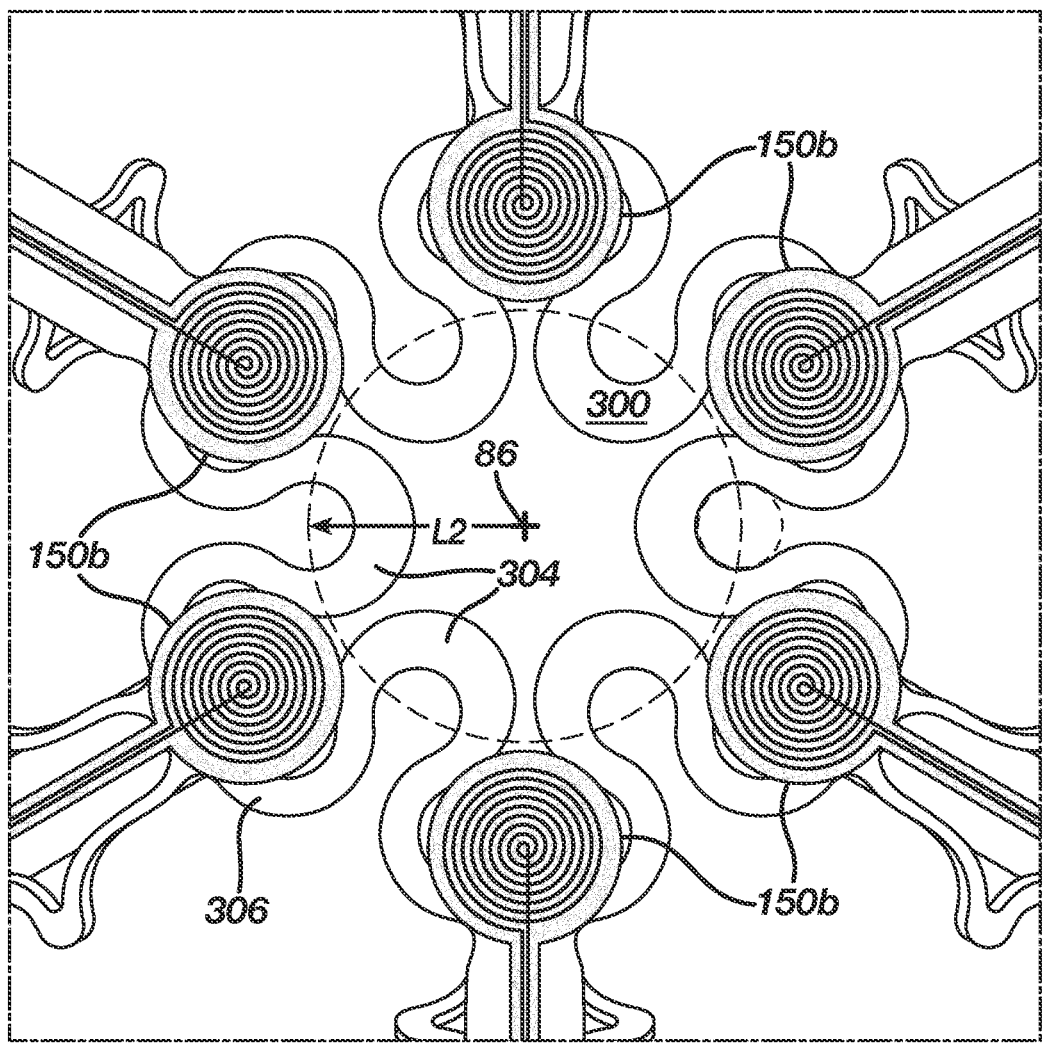
FIG. 6A is an illustration of an end and flattened view of the distal end of the basket spine structure of FIG. 5A as if the entire basket spines are captured flat between two flat plates of glass for viewing by an observer located on the longitudinal axis.

FIG. 6A is an illustration of an end and flattened view of the distal portion of the basket spine structure of FIG. 5A as if the entire basket spines are captured flat between two flat plates of glass for viewing by an observer located on the longitudinal axis. Jackets 217b are not drawn over the outer portion 306 of the cloverleaf structure 300 for the sake of illustration. The basket assembly 100b includes sensors 150b coupled to the outer portion 306 of the cloverleaf structure 300. The sensors 150b are each coupled to a distal surface of the support frame and therefore are positioned in a distal direction in relation to the distal surface of the support frame.

Distal portions of the jackets 217b (FIG. 5A) can be coupled to the sensors 150b and the outer portion 306 of the cloverleaf structure 300, forming an atraumatic structure over the sensors 150b and the outer portion 306 of the cloverleaf structure 300. The distal portion 39*b* of the basket assembly 100*b* can include one or more sensors 150*b*. As indicated in FIG. 4B, the cloverleaf structure 300 can include a curvature 305; in which case the sensors 150*b* may have an axis that is not precisely aligned with the longitudinal axis. Depending on the degree of curvature 305, the sensors 150*b* may be considered to be approximately aligned to the longitudinal axis, and therefore collectively function as a single axis sensor; or with a sufficient degree of curvature 305, the sensors 150*b* may collectively function as a two axis sensor or three axis sensor.

Figure 6B:
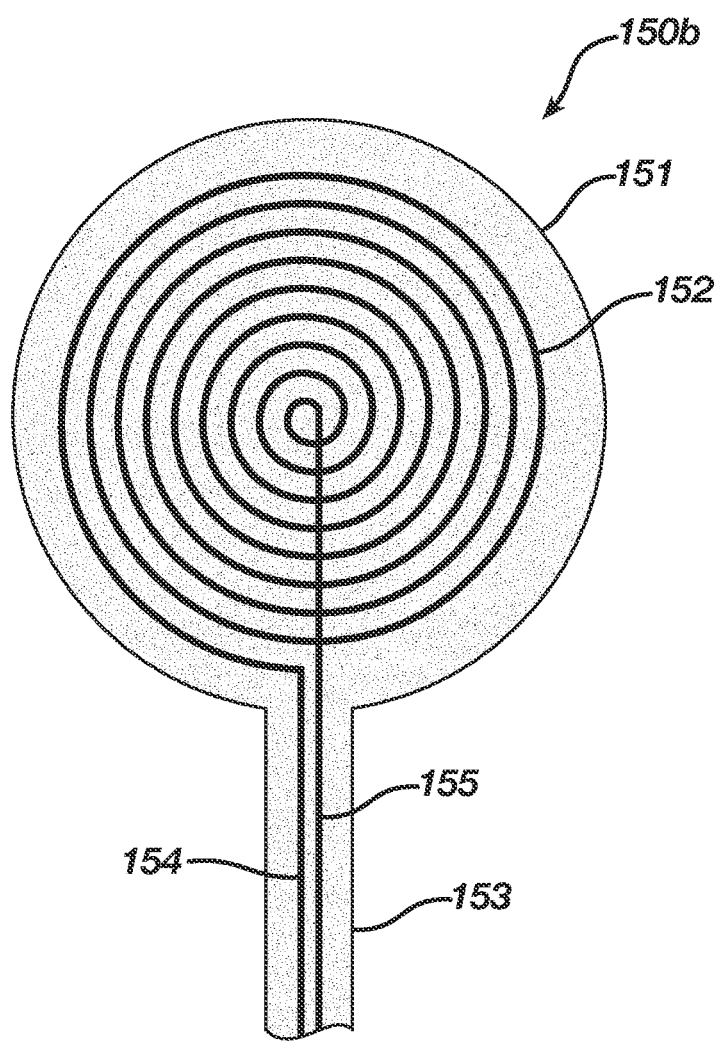
FIG. 6B is an illustration of a distal sensor at the basket distal end according to aspects of the present invention.

FIG. 6B is an illustration of a distal sensor 150*b* that can be positioned over the outer portion 306 of the cloverleaf structure 300 as illustrated in FIG. 6A. The distal sensor 150*b* includes a circular portion 151*b* and a linear portion 153. The circular portion 151 includes a spiral inductor 152. The circular portion is disposed over a distal surface of the support frame of the basket assembly 100*a*. The linear portion 153 includes a first conductive trace 154 from an outer portion of the spiral inductor 152*b* and a second conductive trace 155 from an inner portion of the spiral inductor 152. The linear portion 153 extends in a proximal direction along a spine 214 to the shaft 84 to provide electrical connection of the distal sensor 150*b* to the system 10 (FIG. 10). The sensor 150 as illustrated includes only one spiral inductor 152 for the sake of illustration, however, multiple spiral inductors of similar size to the illustrated spiral inductor 152 can be stacked to increase number of turns, and therefore sensor sensitivity, as understood by a person skilled in the art.

Figure 7A:
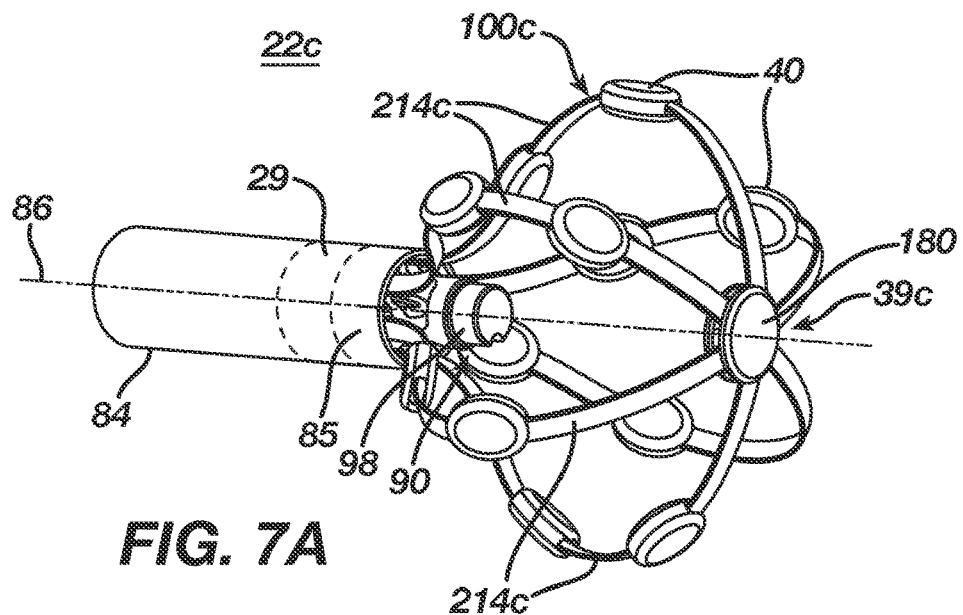
FIG. 7A is an illustration of a perspective view of another example medical probe according to aspects of the present invention.

FIG. 7A is an illustration of a perspective view of another example medical probe 22*c* including a basket assembly 100*c* in an expanded form when unconstrained, such as by being advanced out of a distal end 66 of an insertion tube lumen 60 (FIG. 2A). The medical probe 22*c* can be configured similarly to the medical probe 22*a* with the basket assembly 100*a* illustrated in FIG. 2A replaced by the basket assembly 100*c* illustrated in FIG. 7A. The basket assembly 100*c* includes spine sections 214*c* that are retained by a retention hub 180 at a distal portion 39*c* of the basket assembly 100*c*. The spine sections 214*c* include spine loops extend through the retention hub 180 and two proximal ends secured in the tubular shaft 84. Alternatively, the spine sections 214*c* can include individual spines each with a respective distal end retained by the retention hub 180 and a respective proximal end secured in the tubular shaft 84. The distal hub 180 can be an atraumatic structure covering distal portions of the spine sections 214*c*. The distal hub 180 is configured to maintain a relative position of spines 214 at the distal surface of the support frame.

The tubular shaft 84 is generally aligned along a longitudinal axis 86. The proximal ends of the spine sections 214*c* can be configured similarly to the proximal spine portions 216 illustrated in FIG. 2A, can be coupled to a proximal ring 112 similar to as illustrated in FIG. 2B, or otherwise secured to the tubular shaft 84.

The basket assembly 100*c* includes electrodes 40 over each spines segment 214*c* with two electrodes per spine segment 214*c*. The electrodes 40 can be positioned similar to electrodes 40 illustrated in FIG. 2A or similar to electrodes 40*b* illustrated in FIG. 5A. spine segments 214*c* can be attached to the shaft 84 with a spine retention hub 90. The spine retention hub 90 can include irrigation portions 98 and other features similar to retention hub 90 illustrated in FIG. 2A.

The basket assembly 100*c* can traverse a lumen of the insertion tube 60 (FIG. 2A) in a collapsed state, and can expand to the expanded form as illustrated in FIG. 7A when advanced out of a distal end 66 of the insertion tube 60 (FIG. 2A). The basket assembly 100*c* can be self-expandable such that the spine portions 214*c* expand away from the longitudinal axis 86 upon exiting the insertion tube 60 (FIG. 2A) without requiring an additional mechanism, such as a pusher tube or a puller wire, to cause the basket assembly 100*c* to expand to the expanded form.

The spines 214 form a support frame of the basket assembly 100*c* that provides significant structural and mechanical functionality of the basket assembly 100*c*. The first portion 182 of the retention hub 180 is over a distal surface of the spines 214, and therefore over a distal surface of the support frame. The distal sensor 150*c* is therefore also positioned in a distal direction in relation to the distal surface of the support frame.

Figure 7B:
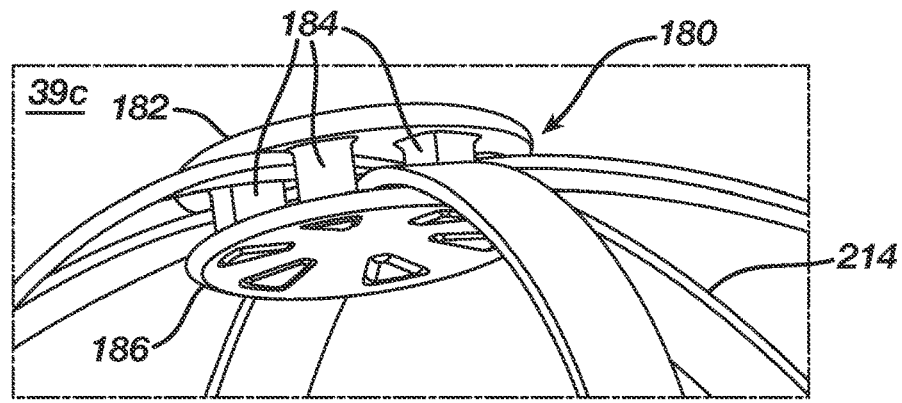
FIG. 7B is an illustration of a perspective view of a distal end of the medical probe illustrated in FIG. 7A.

FIG. 7B is an illustration of a perspective view of the distal portion 39*c* of the medical probe 22*c* illustrated in FIG. 7A. The retention hub 180 includes a first portion 182 positioned in the distal direction in relation to the spines 214 and a second portion 186 positioned in the proximal direction in relation to the first portion 182 such that distal portions of the spines 214 are sandwiched between the first portion 182 and the second portion 186 of the retention hub 180. Protrusions 184 are positioned between distal portions of the spines 214.

Figure 7C:
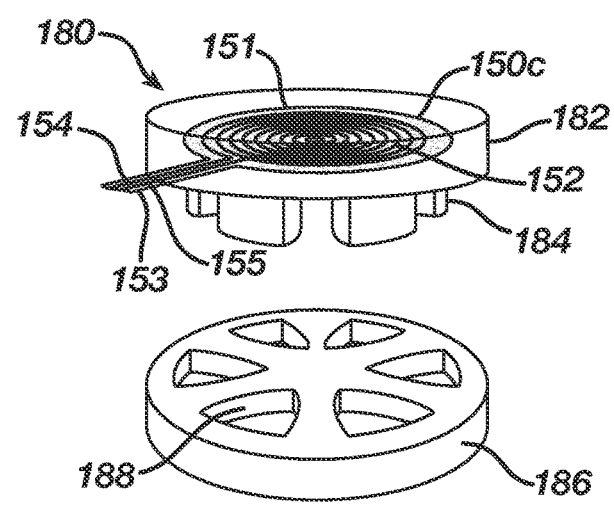
FIG. 7C is an illustration of a loop retention hub of a medical probe according to aspects of the present invention.

FIG. 7C is an illustration of the retention hub 180 illustrated in FIGS. 7A and B with the first portion 182 separated from the second portion 186 and including a sensor 150*c*. The sensor 150*c* is coupled to the first portion so that the sensor 150*c* is positioned in the distal direction in relation to the spines 214. The sensor 150*c* can include a contact force sensor, an electrocardiogram sensor, and/or a position sensor. As illustrated, the sensor 150*c* includes an inductive coil that can function as a single axis magnetic position sensor. The sensor 150*c* includes a circular portion 151 including a spiral inductor 152 and a linear portion 153 including a first conductive trace 154 from an outer portion of the spiral inductor 152 and a second conductive trace 155 from an inner portion of the spiral inductor 152. The linear portion 153 extends in a proximal direction along a spine 214 to the shaft 84 to provide electrical connection of the distal sensor 150*b* to the system 10 (FIG. 1).

The spiral inductor 152 has an axis concentric to the longitudinal axis 86 (FIG. 7A). The sensor 150*c* as illustrated includes only one spiral inductor 152 for the sake of illustration, however, multiple spiral inductors of similar size to the illustrated spiral inductor 152 can be stacked to increase number of turns, and therefore sensor sensitivity, as understood by a person skilled in the art. Further, additional spiral inductors can be added to the retention hub 180, in the first portion 182 and/or the second portion 186, that are at an angle to the illustrated spiral inductor 152 so that the sensor 150*c* in the retention hub 180 is modified to function as a two axis sensor or a three axis sensor.

Additionally, or alternatively, the sensor 150*c* can be coupled to the second portion 186. The sensor 150*c* can otherwise be configured similarly to sensors disclosed elsewhere herein, alternatives thereto, and variations thereof as understood by a person skilled in the art.

The second portion 186 of the retention hub 180 includes indentations 188 configured to receive protrusions 184 extending in a proximal direction from the first portion 182 of the retention hub 180. The hub 180 is configured so that the spines 214 can loop through the retention hub 180 between the protrusions 184 and the protrusions 184 engage the indentations 188 to lock the first portion 182 and the second portion 186 of the retention hub 180 together. The mechanical structure of the retention hub 180 can be modified in various ways to serve as an atraumatic structure and to include the distal sensor 150c as understood by a person skilled in the art.

Compatible features of each basket assembly 100, 100a, 100b, 100c disclosed herein are combinable. The electrodes 40, 40a, 40b can each include a body defining a hollow portion extending through the body of the electrode so that a spine 214 can be inserted into the hollow portion and retained on the spine 214. Each basket assembly 100, 100a, 100b, 100c can include an insulative cover such as the jackets 217, 217b illustrated herein, variations thereof, or alternatives thereto, over each spine 214 to electrically insulate the spine 214 from the electrode 40, 40a, 40b. Additionally, or alternatively, at least a portion of the spines 214 can be electrically conductive and at least one of the electrodes 40, 40a, 40b can be electrically coupled to an electrically conductive spine 214. Spines 214 of any of the basket assemblies 100, 100a, 100b, 100c can include a retention member such as the retention member 220 illustrated in FIG. 2A, and/or can include alternative means for coupling electrodes 40, 40a, 40b to spines 214 such as glue, adhesive, weld, interference fit, or other mechanical structure. The electrodes 40, 40a, 40b of any of the basket assemblies 100, 100a, 100b, 100c can be configured to deliver electrical pulses for IRE. The pulses can have a peak voltage of at least 900 volts (V). The IRE pulses can otherwise be delivered as described in relation to FIG. 1, as disclosed elsewhere herein, as disclosed in the publications incorporated herein by reference, or as understood by a person skilled in the art. The spines 214, when expanded in the basket configuration as illustrated in FIGS. 1, 2A, 5A, and 7A, can form an approximately spherical shape or an approximately oblate-spheroid shape.

Figure 8A:
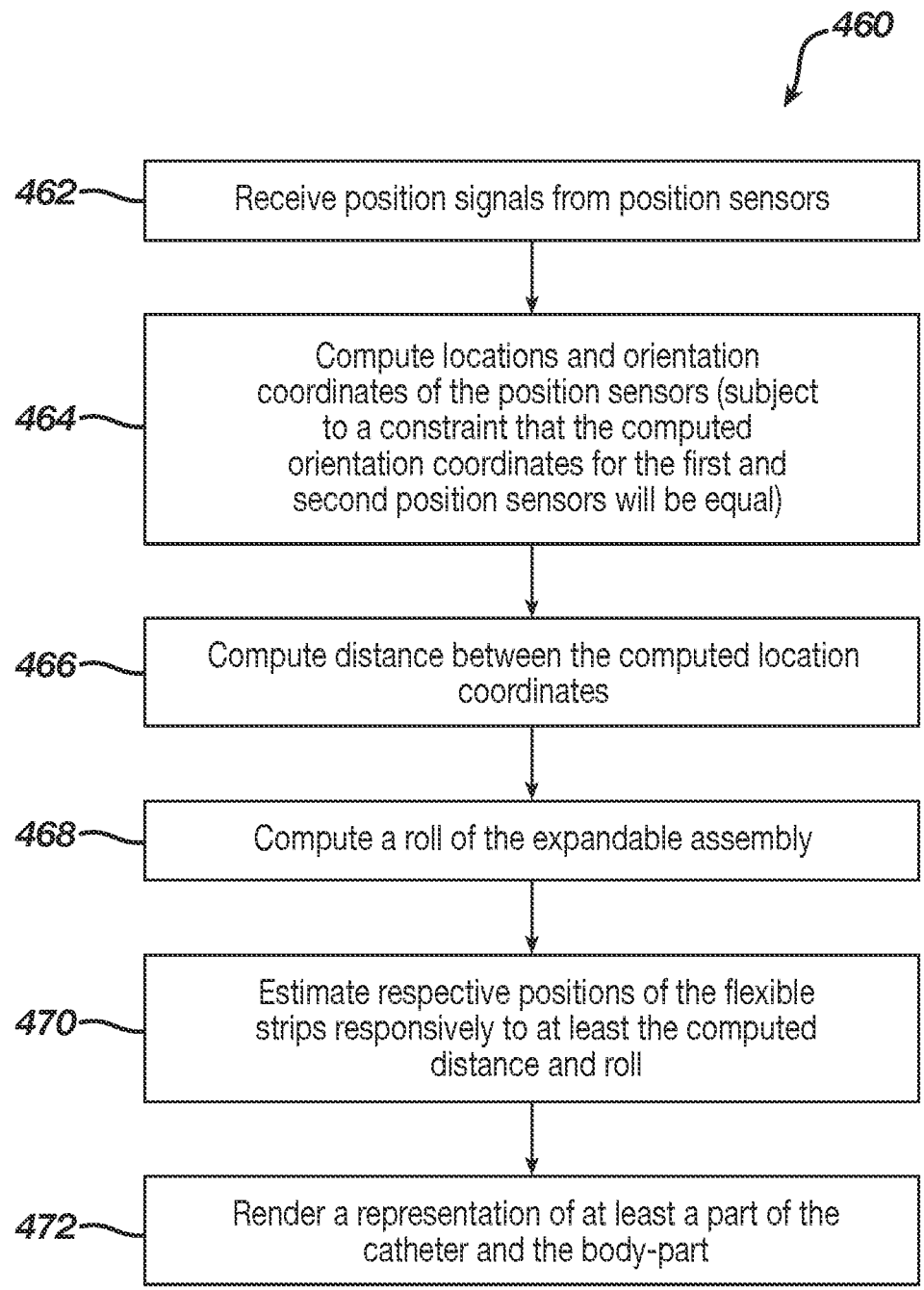
FIG. 8A is a flowchart including steps in a method of operation of the system of FIG. 1 using an example basket catheter according to aspects of the present invention.

FIG. 8A is a flowchart including steps in a method 460 of operation of the system 10 of FIG. 1 using an example the basket catheter, such the catheter 14 illustrated in FIG. 1, variations thereof, or alternatives thereto as understood by a person skilled in the art. The catheter 14 can be configured similarly to the example medical probes 22a, 22b, 22c disclosed herein, variations thereof, or alternatives thereto as understood by a person skilled in the art.

At block 462, position signals from position sensors can be received. The workstation 55 (FIG. 1) can be configured to receive a first position signal from a sensor 29 on the shaft 84 (referred to hereinafter as "shaft sensor 29") and a second position signal from a sensor positioned at a distal portion of the basket assembly 100. The shaft sensor 29 and the sensor positioned at the distal portion of the basket assembly can each include magnetic sensors. A magnetic sensor of the shaft sensor 29 can provide one or more position signals corresponding to one or more coils of the sensor 29. Similarly, a magnetic sensor at the distal portion of the basket assembly 100 may provide one or more position signals corresponding to one or more coils.

The basket assembly 100 can be configured similarly to example basket assemblies 100a, 100b, 100c disclosed herein, variations thereof, or alternatives thereto as understood by a person skilled in the art. The distal portion of the basket assembly 100 can be configured similarly to example distal portions 39a, 39b, 39c disclosed herein, variations thereof, or alternatives thereto as understood by a person skilled in the art. The magnetic sensor at the distal portion of the basket assembly 100 can be configured similarly to distal sensor 150 (FIG. 1), which can be configured similarly to example distal sensors 150a, 150b, 150c disclosed herein, variations thereof, or alternatives thereto as understood by a person skilled in the art. The magnetic sensor of the distal sensor 150 may be coupled to an atraumatic structure such as the distal cover 45a illustrated in FIGS. 2A through 2C, distal portions of the jackets 217b illustrated in FIG. 5A, the spine retention hub 180 illustrated in FIG. 7A through 7C, variations thereof, or alternatives thereto as understood by a person skilled in the art.

The shaft sensor 29 and the distal sensor 150 may each include a respective single axis sensor (SAS), double axis sensor (DAS), or three axis sensor (TAS). The magnetic sensors of the shaft sensor 29 and the distal sensor 150 may be the same type of sensor, or different types of sensor. If the magnetic sensors of both the shaft sensor 29 and the distal sensor 150 are single-axis sensors, the catheter 14 generally includes another position sensor to track a roll of the basket assembly 100. The magnetic sensors of the shaft sensor 29 and the distal sensor 150 are configured to output respective first and second position signals in response to the transmitted alternating magnetic fields transmitted by the magnetic field generator coil(s) 32 (FIG. 1).

At block 464, locations and orientation coordinates of the position sensors can be computed. The computation can be subject to the constraint that the computed orientation coordinates for the first and second position sensors are equal. The workstation 55 can be configured to compute location and orientation coordinates for the shaft sensor 29 and the distal sensor 150 based at least in part on the position signals received at block 462. The workstation 55 can be configured to use a position computation in which the location and orientation coordinates of magnetic sensors of the shaft sensor 29 and the distal sensor 150 are interdependently computed in an iterative manner responsively to the respective received position signal, and subject to a constraint that the magnetic sensors include coils that are coaxial and therefore have a same orientation. Coils of the sensors 29, 150a, 150b, 150c can be coaxial to the longitudinal axis 86.

The workstation 55 can be configured to compute the location and orientation coordinates for the magnetic sensors (of shaft sensor 29 and distal sensor 150) subject to a constraint that the computed orientation coordinates for the magnetic sensors will be equal within a given tolerance, such as plus or minus 2 degrees.

The step of block 464 is described in more detail with reference to FIGS. 7B and 7C.

At block 466, the workstation 55 can be configured to compute a distance between the computed location coordinates of the magnetic sensor of the shaft sensor 29 and the computed location coordinates of the magnetic sensor of the distal sensor 150. The computed distance is indicative of the bow of the spines 214 and the general shape of the basket assembly 100 as will be described below in more detail with reference to the step of block 470.

At block 468, the workstation 55 can be configured to compute a roll of the basket assembly 100 responsively to the position signal(s) from the magnetic sensor of the shaft sensor 29 and/or from the magnetic sensor of the distal sensor 150 and/or from another position sensor of the catheter 14. The sensor providing data for computation of roll can include a DAS or a TAS.

The bow of the spines 214 and/or the positions of the electrodes 40 (or other features) on the spines 214 with respect to a fixed point on the catheter 14 may be measured for various distances between the magnetic sensors of the shaft sensor 29 and the distal sensor 150. The fixed point may be at a distal end 85 of the shaft 84, at the distal surface 99 of the spine retention hub 90 (FIG. 2A), or other suitable location. For example, referring to FIG. 2A, the basket assembly 100*a* can be compressed by a longitudinal force applied along the longitudinal axis 86 to the distal portion 39*a*, and positions of the electrodes 40 with respect to a fixed point on the catheter 14 may be measured for every 0.2 mm movement of the distal portion 39*a* with respect to the fixed point, and after each 0.2 mm movement, the computed distance between the magnetic sensors of the shaft sensor 29 and the distal sensor 150*a* is recorded along with the positions of the electrodes 40. The same technique can be applied to basket assemblies 100*b*, 100*c* illustrated in FIGS. 5A and 7A. This data may then be used to find the bow of the spines 214 and/or the positions of the electrodes 40 (or other features) on the spines 214 with respect to the fixed point on the catheter 14 responsively to the computed distance between the magnetic sensors of the shaft sensor 29 and distal sensor 150.

The bow of the spines 214 and/or the positions of the electrodes 40 (or other features) on the spines 214 with respect to the fixed point on the catheter 14 may be computed based on the computed distance between the magnetic sensors of the shaft sensor 29 and the distal sensor 150 and a model of the catheter 14 which provides the bow of the spines 214 and/or the positions of the electrodes 40 for the computed distance based on the mechanical properties and dimensions of the spines 214.

At block 470, the workstation 55 can be configured to estimate respective positions of the spines 214 responsively to the computed distance, the computed roll and the computed location and orientation coordinates of one or more of the magnetic sensors of the shaft sensor 29 and the distal sensor 150. The computed distance provides the respective positions of the spines 214 with respect to a fixed point of the catheter 14. The computed roll, location and orientation coordinates of one or more of the magnetic sensors provides the respective positions of the spines 214 with respect to a magnetic coordinate frame used in the system 10 (FIG. 1).

At block 472, the workstation 55 can be configured to render to the display 27 (FIG. 1), a representation 20 of at least a part of the catheter 14 and the body-part (e.g., the heart 26) responsively to the estimated respective positions of the spines 214 and a computed position of the distal tip 28 of the catheter 14 (for example, based on signal(s) received from the shaft sensor 29).

Figure 8B:
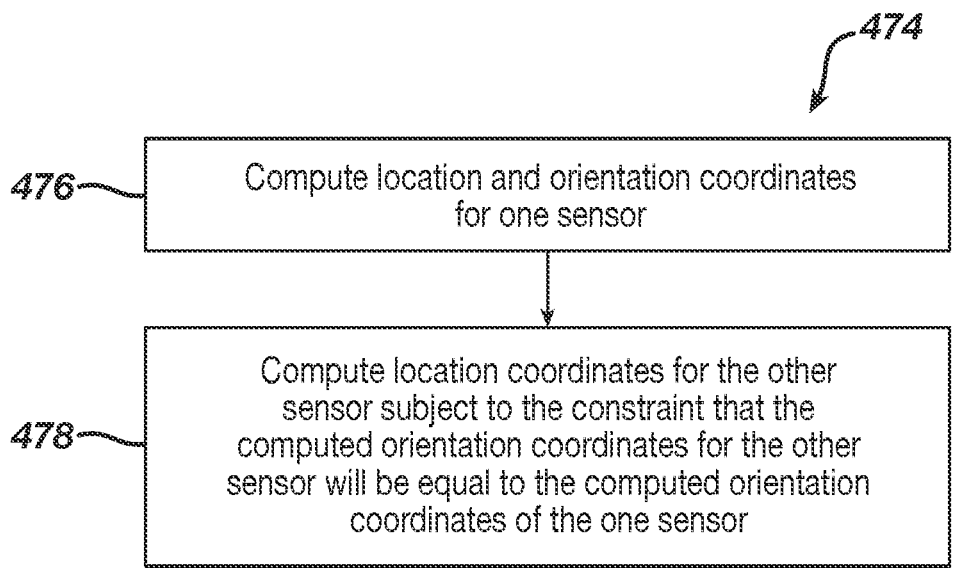
FIG. 8B is a flowchart including sub-steps in the method of operation of FIG. 8A.

FIG. 8B is a flowchart of a method 474 including sub-steps in the method 460 of operation of FIG. 8A. The following sub-steps are sub-steps of the step of block 464 of FIG. 8A.

At block 476, location and orientation for one sensor can be computed. The workstation 55 (FIG. 1) can be configured to compute the location and orientation coordinates for one sensor of the magnetic sensors of the shaft sensor 29 or the distal sensor 150 using the position computation, responsively to the received signal(s) of the one sensor.

At block 478, location coordinates for the other sensor can be computed subject to the constraint that the computed orientation of the other sensor will be equal to the computed orientation coordinates of the one sensor. The workstation 55 can be configured to compute the location coordinates for the other sensor of the magnetic sensors using the position computation, subject to a constraint that the computed orientation coordinates for the other sensor will be equal to the computed orientation coordinates of the one sensor within a given tolerance, such as plus or minus 2 degrees.

Figure 8C:
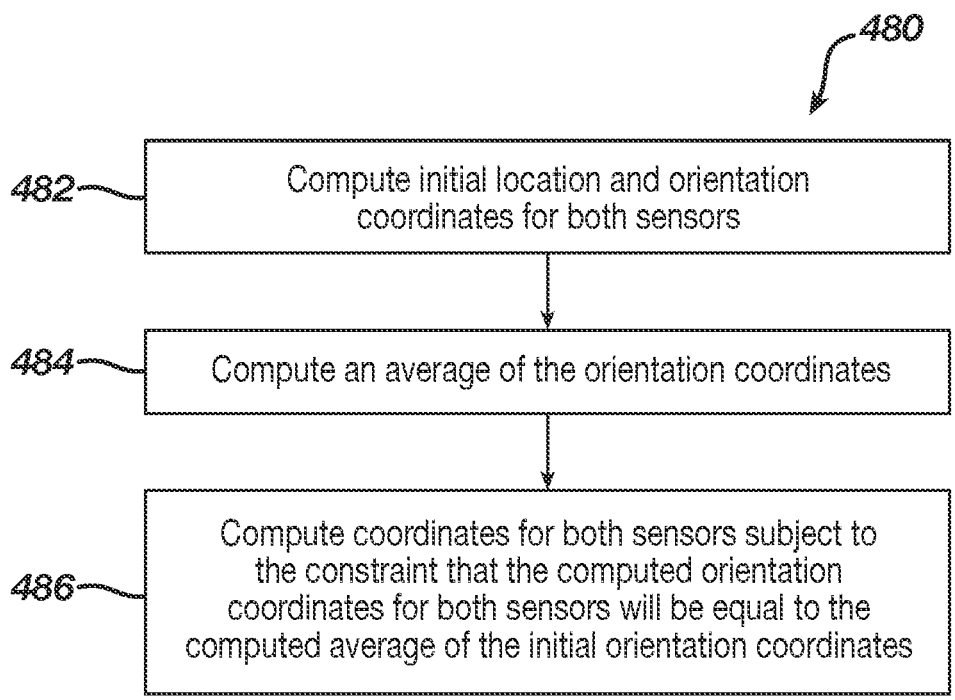
FIG. 8C is a flowchart including alternative sub-steps in the method of operation of FIG. 8A.

FIG. 8C is a flowchart including alternative sub-steps in the method 480 of operation of FIG. 8A. The following sub-steps are sub-steps of the step of block 464 of FIG. 8A.

At block 482, initial location and orientation of the coordinates for both sensors 29, 150 can be computed. The workstation 55 (FIG. 1) can be configured to compute initial location and initial orientation coordinates for both the magnetic sensors of the shaft sensor 29 and the distal sensor 150 using the position computation.

At block 484, an average of the orientation coordinates can be computed. The workstation 55 can be configured to compute an average of the initial orientation coordinates of the magnetic sensors. For example, if the orientation coordinates are represented by two angles $\theta$, $\varphi$, for example representing yaw and pitch respectively, the orientation of magnetic sensor of the shaft sensor 29 being $\theta A$, $\varphi A$ and the orientation of magnetic sensor of the distal sensor 150 being $\theta B$, $\varphi B$, the average orientation of the magnetic sensors is equal to the $\theta av$, $\varphi av$, where $\theta av$ is the average of $\theta A$ and $\theta B$, and $\varphi av$ is the average of $\varphi A$ and $\varphi B$.

At block 486, coordinates for both sensors can be computed subject to the constraint that the computed orientation coordinates for both sensors will be equal to the computed average of the initial orientation coordinates. The workstation 55 can be configured to compute the location and orientation coordinates for magnetic sensors of the shaft sensor 29 and the distal sensor 150 using the position computation based on the signals received from the sensors 29, 150 and subject to a constraint that the orientation coordinates for both magnetic sensors will be equal to the computed average of the initial orientation coordinates within a given tolerance, such as plus or minus 2 degrees.

The basket assembly 100 may also be deformed so that the magnetic sensors of the shaft sensor 29 and the distal sensor 150 are not coaxial. For instance, a lateral force that is at an angle to the longitudinal axis 86 can be applied to a side or distal portion of the basket assembly 100 to cause the basket assembly 100 to deform in a non-symmetrical way to move the distal sensor 150 out of alignment with the longitudinal axis 86.

Figure 9:
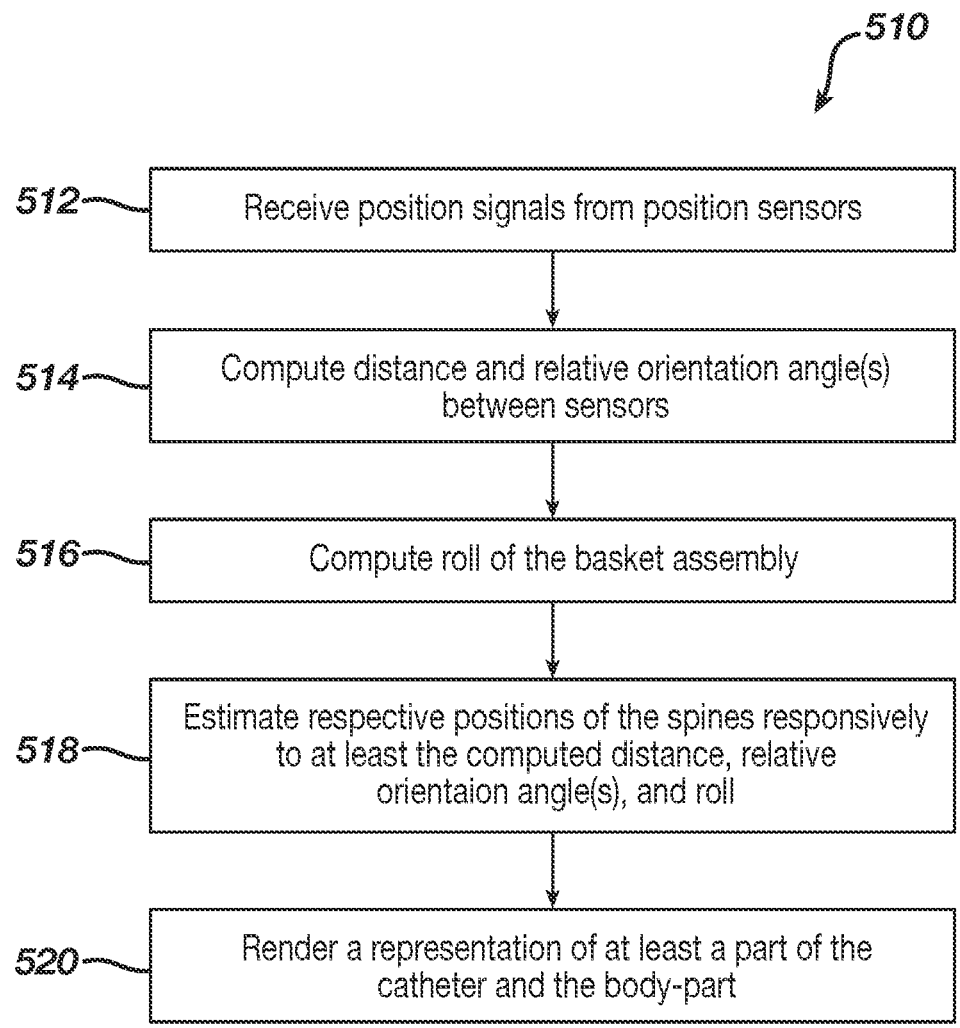
FIG. 9 is a flowchart including steps in another method of operation of the system of FIG. 1 using an example basket catheter according to aspects of the present invention.

FIG. 9 is a flowchart including steps in another method 510 of operation of the system 10 of FIG. 1 using an example the basket catheter, such the catheter 14 illustrated in FIG. 1, variations thereof, or alternatives thereto as understood by a person skilled in the art. The catheter 14 can be configured similarly to the example medical probes 22*a*, 22*b*, 22*c* disclosed herein, variations thereof, or alternatives thereto as understood by a person skilled in the art.

At block 512, position signals can be received from position sensors of the shaft sensor 29 and the distal sensor 150. The workstation 55 (FIG. 1) can be configured to receive first and second position signals from the magnetic sensors of the shaft sensor 29 and distal sensor 150, respectively. In some embodiments, the magnetic sensor of the shaft sensor 29 may provide one or more position signals corresponding to one or more coils of the magnetic sensor. Similarly, the magnetic sensor of the distal sensor 150 may provide one or more position signals corresponding to one or more coils of the magnetic sensor.

At block 514, distance and relative orientation angle(s) between sensor can be computed. The workstation 55 can be configured to compute a distance and a relative orientation angle between the magnetic sensors responsively to the received position signals that are received at block 512. The relative orientation angle having a value greater than zero is generally indicative that the basket assembly 100 is deflected to a side with respect to the longitudinal axis 86, and that at least some of the spines 214 are distorted as compared to a shape of the spines 214 when the basket assembly 100 is centrally positioned around the longitudinal axis 86.

At block 516, a roll of the basket assembly 100 can be computed. The workstation 55 can be configured to compute a roll of the basket assembly 100 responsively to the position signal(s) from one or more of the magnetic sensors or from another sensor disposed on the catheter 14.

The bow of the spines 214 and/or the positions of the electrodes 40 (or other features) on the spines 214 with respect to a fixed point on the catheter 14 may be measured for various distances between the magnetic sensors of the shaft sensor 29 and the distal sensor 150 and for various relative orientation angles between the magnetic sensors. The fixed point may be at a distal end 85 of the shaft 84, at the distal surface 99 of the spine retention hub 90 (FIG. 2A), or other suitable location. For example, the positions of the electrodes 40 with respect to the fixed point on the catheter 14 may be measured for approximately every 0.2 mm movement of the distal sensor 150 with respect to the shaft 84 and for every 1 degree of relative orientation between the magnetic sensors of the shaft sensor 29 and the distal sensor 150 (up to a maximum sideways movement of the basket assembly 100). At each different distance/relative-orientation combination, the computed distance and computed relative orientation angle between the magnetic sensors of the shaft sensor 29 and the distal sensor 150 is recorded along with the position data of the electrodes 40. This data may then be used to estimate the bow of the spines 214 and/or the positions of the electrodes 40 (or other features) on the spines 214 with respect to the fixed point on the catheter 14 responsively to the computed distance and relative orientation angle between the magnetic sensors of the shaft sensor 29 and the distal sensor 150.

Additionally, or alternatively, the bow of the spines 214 may be estimated based on the following assumptions: (a) each of the spines 214 is of a fixed and known length; (b) each of the spines 214 are coupled at a distal end of the basket assembly symmetric about the longitudinal axis 86 such the distal sensor 150 is substantially perpendicular (within an error of plus or minus 10 degrees) to the longitudinal axis 86 with a distal coupling member (e.g. cloverleaf structure 300, retention hub 180, etc.); (c) each of the spines 214 is connected to the shaft 84, substantially parallel (within an error of plus or minus 10 degrees) to the longitudinal axis 86 (e.g. spine retention hub 90, etc.). Based on the above assumptions (a)-(c), and the computed positions of the coupling members based on the computed positions of the magnetic sensors of the shaft sensor 29 and the distal sensor 150, the bow of each of the spines 214 may be computed using a third-degree polynomial. In some embodiments, the bow of the spines 214 and/or the positions of the electrodes 40 (or other features) on the spines 214 with respect to the fixed point on the catheter 14 may be computed based on the computed distance and orientation between the magnetic sensors of the shaft sensor 29 and the distal sensor 150 and a model of the catheter 14 which provides the bow of the spines 214 and/or the positions of the electrodes 40 for the computed distance based on the mechanical properties and dimensions of the spines 214.

At block 518, respective positions of the spines 214 can be estimated responsively to at least the computed distance, relative orientation angle(s), and roll. The workstation 55 can be configured to estimate respective positions of the spines 214 responsively to at least the computed distance and relative orientation angle, while accounting for a distortion of one or more of the spines 214 from a symmetrical disposition about the longitudinal axis 86 when the relative orientation angle of the distal sensor 150 to the longitudinal axis 86 in relation to the shaft sensor 29 has a value greater than zero. The computed distance and relative orientation angle between the magnetic sensors of the shaft sensor 29 and the distal sensor 150 provide the respective positions of the spines 214 with respect to the fixed point of the catheter 14. The computed roll, location and orientation coordinates of one or more of the magnetic sensors of the shaft sensor 29 and the distal sensor 150 provides the respective positions of the spines 214 with respect to the magnetic coordinate frame used in the system 10 (FIG. 1).

At block 520, a representation of at least a part of the catheter 14 and the body part can be rendered. The workstation 55 can be configured to render to the display 27 (FIG. 1), the representation 20 of at least a part of the catheter 14 and the body-part (e.g., the heart 26) responsively to the estimated respective positions of the spines 214 and a computed position of the shaft 84 (for example, based on signal(s) received from the magnetic sensor of the shaft sensor 29).

Having shown and described exemplary embodiments of the subject matter contained herein, further adaptations of the methods and systems described herein may be accomplished by appropriate modifications without departing from the scope of the claims. In addition, where methods and steps described above indicate certain events occurring in certain order, it is intended that certain steps do not have to be performed in the order described but in any order as long as the steps allow the embodiments to function for their intended purposes. Therefore, to the extent there are variations of the invention, which are within the spirit of the disclosure or equivalent to the inventions found in the claims, it is the intent that this patent will cover those variations as well. Some such modifications should be apparent to those skilled in the art. For instance, the examples, embodiments, geometrics, materials, dimensions, ratios, steps, and the like discussed above are illustrative. Accordingly, the claims should not be limited to the specific details of structure and operation set forth in the written description and drawings.

The following clauses list non-limiting embodiments of the disclosure:

Clause 1. An end effector of a catheter, the end effector comprising: a support frame comprising a plurality of spines configured to self-expand away from a longitudinal axis from a proximal portion to a distal spine portion to form a basket configuration, the distal spine portion defining a cloverleaf structure disposed radially around the longitudinal axis, the cloverleaf structure defining a central cutout with a central area disposed about the longitudinal axis, the cloverleaf structure includes inner arcs defining a concave perimeter about the longitudinal axis; and an atraumatic structure covering a portion of the cloverleaf structure of the support frame so that only inner arcs of the cloverleaf structure extending towards the proximal portion are visible.

Clause 2. The end effector of clause 1, further comprising: a sensor coupled to the atraumatic structure; and a plurality of electrodes coupled to the plurality of spines such that a respective electrode of the plurality of electrodes is coupled to a respective spine of the plurality of spines.

Clause 3. The end effector of clause 2, the sensor being disposed in a distal direction in relation to the distal surface of the support frame in the basket configuration.

Clause 4. The end effector of clause 2 or 3, the sensor comprising a contact force sensor.

Clause 5. The end effector of any one of clauses 2-4, the sensor comprising an electrocardiogram sensor.

Clause 6. The end effector of any one of clauses 2-5, the sensor comprising a position sensor.

Clause 7. The end effector of clause 6, the position sensor comprising an inductive coil.

Clause 8. The end effector of clause 6 or 7, the position sensor comprising a magnetic sensor.

Clause 9. The end effector of any one of clauses 6-8, the position sensor comprising a single-axis sensor comprising a sensor axis that is coaxial to the longitudinal axis.

Clause 10. The end effector of clause 9, wherein the atraumatic structure comprises a flex circuit.

Clause 11. The end effector of clause 10, wherein the flex circuit comprises a circular portion covering the distal surface of the support frame, thereby forming an atraumatic cover over the distal surface of the support frame, and an elongated portion extending proximally along a spine of the plurality of spines.

Clause 12. The end effector of clause 10 or 11, wherein the single-axis sensor comprises a spiral conductor embedded in the circular portion of the flex circuit.

Clause 13. The end effector of any one of clauses 10-12, wherein the support frame comprises a distal structure joining the spines and defining a central cutout with a central area disposed about the longitudinal axis, the atraumatic structure covering at least a portion of the central cutout.

Clause 14. The end effector of clause 13, wherein the distal structure comprises sinusoidal-like member extending from one spine to an adjacent spine in a direction around the longitudinal axis and forming the cloverleaf structure.

Clause 15. The end effector of any one of clauses 1-9, further comprising: a plurality of jackets over the plurality of spines.

Clause 16. The end effector of clause 15, wherein the plurality of jackets extend and over a majority of the cloverleaf structure such that the atraumatic structure comprises a respective distal portion of each jacket of the plurality of jackets.

Clause 17. The end effector of clause 15 or 16, wherein the inner arcs extend from distal ends of the plurality of jackets and between adjacent jackets of the plurality of jackets.

Clause 18. The end effector of any one of clauses 15-17, further comprising: a plurality of electrodes positioned in pairs such that each spine comprises a respective electrode pair and such that the electrode pair of a spine does not longitudinally overlap an electrode pair of an adjacent spine.

Clause 19. The end effector of any one of clauses 1-18, wherein each electrode comprises a body defining a hollow portion extending through the body of the electrode so that a spine can be inserted into the hollow portion and retained on the spine.

Clause 20. The end effector of clause 19, wherein each spine comprises a retention member configured to be compressed to allow an electrode to be moved over the retention member, and the retention member being configured to expand to inhibit movement of the electrode along the spine.

Clause 21. The end effector of any one of clauses 1-20, wherein the plurality of electrodes is configured to deliver electrical pulses for irreversible electroporation, the pulses including a peak voltage of at least 900 volts (V).

Clause 22. The end effector of any one of clauses 1-21, wherein the plurality of spines is configured to form an approximately spherically-shaped basket assembly when in the basket configuration.

Clause 23. The end effector of any one of clauses 1-22, wherein the plurality of spines is configured to form an approximately oblate-spheroid basket assembly when in the basket configuration.

Clause 24. An end effector of a catheter, the end effector comprising: a support frame comprising a plurality of spines configured to expand away from a longitudinal axis to form a basket configuration; an atraumatic structure coupled to the plurality of spines at a distal end of the support frame; a sensor coupled to the atraumatic structure and positioned distal of the support frame; and a plurality of electrodes coupled to the plurality of spines such that a respective electrode of the plurality of electrodes is coupled to a respective spine of the plurality of spines.

Clause 25. The end effector of clause 24, wherein the atraumatic structure comprises a rigid, electrically insulating structure.

Clause 26. The end effector of clause 24 or 25, wherein the atraumatic structure is configured to maintain a relative position of spines of the plurality of spines at the distal surface of the support frame.

Clause 27. The end effector of any one of clauses 24-26, wherein the sensor comprises a single axis sensor, a two axis sensor, and/or a three axis sensor.

Clause 28. The end effector of any one of clauses 24-27, the sensor comprising a contact force sensor.

Clause 29. The end effector of any one of clauses 24-28, the sensor comprising an electrocardiogram sensor.

Clause 30. The end effector of any one of clauses 24-29, the sensor comprising a position sensor.

Clause 31. The end effector of clause 30, the position sensor comprising an inductive coil.

Clause 32. The end effector of clause 30 or 31, the position sensor comprising a magnetic sensor.

Clause 33. The end effector of any one of clauses 30-32, the position sensor comprising a single-axis sensor comprising a sensor axis that is coaxial to the longitudinal axis.

Clause 34. The end effector of any one of clauses 24-33, wherein each electrode comprises a body defining a hollow portion extending through the body of the electrode so that a spine can be inserted into the hollow portion and retained on the spine.

Clause 35. The end effector of clause 34, wherein each spine comprises a retention member configured to be compressed to allow an electrode to be moved over the retention member, and the retention member being configured to expand to inhibit movement of the electrode along the spine.

Clause 36. The end effector of any one of clauses 24-35, wherein the plurality of electrodes is configured to deliver electrical pulses for irreversible electroporation, the pulses including a peak voltage of at least 900 volts (V).

Clause 37. The end effector of any one of clauses 24-36, wherein the plurality of spines is configured to form an approximately spherically-shaped basket assembly when in the basket configuration.

Clause 38. The end effector of any one of clauses 24-37, wherein the plurality of spines is configured to form an approximately oblate-spheroid basket assembly when in the basket configuration.

Clause 39. A system comprising: a catheter configured to be inserted into a body-part of a living subject, the catheter comprising an shaft and a basket assembly, the shaft comprising a first coil-based position sensor disposed approximate a distal end of the shaft, the basket assembly comprising a self-expandable support frame and a second coil-based position sensor coupled to a distal end of the self-expandable support frame, and the basket assembly further comprising a plurality of electrodes coupled to a plurality of spines such that a respective electrode of the plurality of electrodes is coupled to a respective spine of the plurality of spines; at least one magnetic field radiator configured to transmit alternating magnetic fields into a region where the body-part is located, the first and second position sensors being configured to output respective first and second position signals in response to the transmitted alternating magnetic fields; and processing circuitry configured to: receive the first and second position signals from the first and second position sensors; compute location and orientation coordinates for the first and second position sensors using a position computation in which the location and orientation coordinates of each of the position sensors are interdependently computed in an iterative manner responsively to the respective received position signals, and subject to a constraint that the first and second position sensors are coaxial; compute a distance between the computed location coordinates of the first position sensor and the computed location coordinates of the second position sensor; and estimate respective positions of the plurality of spines responsively to at least the computed distance.

Clause 40. A system comprising: a catheter configured to be inserted into a body-part of a living subject, the catheter comprising an shaft and a basket assembly, the shaft comprising a first coil-based position sensor disposed approximate a distal end of the shaft, the basket assembly comprising a self-expandable support frame and a second coil-based position sensor coupled to a distal end of the self-expandable support frame, and the basket assembly further comprising a plurality of electrodes coupled to a plurality of spines such that a respective electrode of the plurality of electrodes is coupled to a respective spine of the plurality of spines; at least one magnetic field radiator configured to transmit alternating magnetic fields into a region where the body-part is located, the first and second position sensors being configured to output respective first and second position signals in response to the transmitted alternating magnetic fields; and processing circuitry configured to: receive the first and second position signals from the first and second position sensors; compute a distance and a relative orientation angle between the first and second position sensors responsively to the received position signals; and estimate respective positions of the plurality of spines responsively to at least the computed distance and relative orientation angle, while accounting for a distortion of one or more of the plurality of spines from a symmetrical disposition when the relative orientation angle has a value greater than zero.

Clause 41. The system of clause 39 or 40, the second coil-based position sensor being disposed in a distal direction in relation to a distal surface of the self-expandable support frame.

Clause 42. A method, comprising: inserting a catheter into a body-part of a living subject, the catheter comprising an shaft and a basket assembly, a first coil-based position sensor disposed at a distal end of the shaft, the basket assembly comprising a self-expandable support frame and a second coil-based position sensor coupled to a distal end of the self-expandable support frame, and the basket assembly further comprising a plurality of electrodes coupled to a plurality of spines such that a respective electrode of the plurality of electrodes is coupled to a respective spine of the plurality of spines; unsheathing the basket assembly to allow the self-expandable support frame to form a basket shape; transmitting alternating magnetic fields into a region where the body-part is located; outputting by the first and second position sensors respective first and second position signals in response to the transmitted alternating magnetic fields; receiving the first and second position signals from the first and second position sensors; computing location and orientation coordinates for the first and second position sensors using a position computation in which the location and orientation coordinates of each of the position sensors are interdependently computed in an iterative manner responsively to the respective received position signals, and subject to a constraint that the first and second position sensors are coaxial; computing a distance between the computed location coordinates of the first position sensor and the computed location coordinates of the second position sensor; and estimating respective positions of the plurality of spines responsively to at least the computed distance.

Clause 43. A method, comprising: inserting a catheter into a body-part of a living subject, the catheter comprising an shaft and a basket assembly, a first coil-based position sensor disposed at a distal end of the shaft, the basket assembly comprising a self-expandable support frame and a second coil-based position sensor coupled to a distal end of the self-expandable support frame, and the basket assembly further comprising a plurality of electrodes coupled to a plurality of spines such that a respective electrode of the plurality of electrodes is coupled to a respective spine of the plurality of spines; unsheathing the basket assembly to allow the self-expandable support frame to form a basket shape; transmitting alternating magnetic fields into a region where the body-part is located; outputting by the first and second position sensors respective first and second position signals in response to the transmitted alternating magnetic fields; receiving the first and second position signals from the first and second position sensors; computing a distance and a relative orientation angle between the first and second position sensors responsively to the received position signals; and estimating respective positions of the plurality of spines responsively to at least the computed distance and relative orientation angle, while accounting for a distortion of one or more of the plurality of spines from a symmetrical disposition when the relative orientation angle has a value greater than zero.

Clause 44. A method of constructing a medical probe, the method comprising: forming a support frame comprising a plurality of spines; configuring the plurality of spines to be positioned around a longitudinal axis and self-expandable away from the longitudinal axis; covering a distal surface of the support frame with an atraumatic structure; coupling a sensor to the atraumatic structure; and coupling a plurality of electrodes to the plurality of spines such that a respective electrode of the plurality of electrodes is coupled to a respective spine of the plurality of spines.

Clause 45. The method of clause 44, wherein the support frame comprises a distal structure joining the spines and defining a central cutout with a central area disposed about the longitudinal axis, the central cutout defining an opening in the distal surface of the support frame.

Clause 46. The method of clause 45, wherein forming the support frame from the plurality of spines comprises cutting a tube such that the distal structure circumscribes the tube and the plurality of spines extend longitudinally along the tube.

Clause 47. The method of clause 44, further comprising: coupling distal portions of the plurality of spines with the atraumatic structure.

Clause 48. The method of clause 47, wherein the sensor is embedded in the atraumatic structure.

Clause 49. A method of constructing a medical probe, the method comprising: inserting a plurality of spines into a plurality of jackets such that the plurality of spines extend along a longitudinal axis from a proximal central proximal spine portion to a distal spine portion, the distal spine portion defining a cloverleaf structure disposed radially around the longitudinal axis, the cloverleaf structure defining a central cutout with a central area disposed about the longitudinal axis, and such that the plurality of jackets each cover a majority of a the distal spine portion; aligning the plurality of spines with a plurality of electrodes each having a lumen extending through the body of the electrode; inserting each spine of the plurality of spines into the lumen of an electrode of the plurality of electrodes; and retaining the plurality of electrodes on the plurality of spines.

Clause 50. The method of clause 49, wherein retaining the plurality of electrodes on the plurality of spines comprises retaining an electrode of the plurality of electrodes with at least one biasing member.

Clause 51. The method of clause 50, in which the at least one biasing member is disposed outside of the lumen of the electrode.

Clause 52. The method of clause 50, in which the at least one biasing member is disposed inside the lumen of the electrode.

Clause 53. The method according to clause 49, further comprising: positioning a wire through the lumen of an electrically insulative jacket; positioning an electrode of the plurality of electrodes over the electrically insulative jacket; and electrically connecting the wire to the electrode through an aperture in the electrically insulative jacket.

Clause 54. The method according to clause 49, wherein each respective spine of a plurality of spines comprises a first electrode and a second electrode, the method further comprising: aligning each respective spine of the plurality of spines with the first electrode and the second electrode; inserting each respective spine of the plurality of spines into a lumen of the first electrode and a lumen of the second electrode; and fitting an end of each respective spine of the plurality of spines to a tubular shaft sized to traverse vasculature.

Clause 55. The method according to any one of clauses 49-54, further comprising offsetting the electrodes between adjacent spines along the longitudinal axis.

Clause 56. The method according to any of clauses 49-54, wherein the electrode body lumen is configured to receive the wire of the medical probe.

Clause 57. The method according to any of clauses 49-56, wherein the wire is insulated from the spine.

Clause 58. An end effector of a catheter, the end effector comprising: a support frame comprising a plurality of spines configured to self-expand away from a longitudinal axis from a proximal portion to a distal spine portion to form a basket configuration, the distal spine portion defining a cloverleaf structure disposed radially around the longitudinal axis, the cloverleaf structure defining a central cutout with a central area disposed about the longitudinal axis; a plurality of jackets over the plurality of spines and a majority of the cloverleaf structure; and a plurality of electrodes each coupled to a respective spine of the plurality of spines.

Clause 59. The end effector of clause 58, further comprising: a plurality of sensors each disposed between a respective jacket of the plurality of jackets and the cloverleaf structure.

Clause 60. The end effector of clause 59, wherein the plurality of sensors comprise inductive sensors.

Clause 61. The end effector of clause 58 or 59, wherein the plurality of sensors are configured to collectively function as a three axis sensor.

What is claimed is:

1. An end effector of a catheter, the end effector comprising:
a support frame comprising a plurality of spines configured to self-expand away from a longitudinal axis from a proximal portion to a distal spine portion to form a basket configuration, the distal spine portion defining a cloverleaf structure disposed radially around the longitudinal axis, the cloverleaf structure defining a central cutout with a central area disposed about the longitudinal axis, the cloverleaf structure includes inner arcs defining a concave perimeter about the longitudinal axis; and
an atraumatic structure covering a portion of the cloverleaf structure of the support frame so that only inner arcs of the cloverleaf structure extending towards the proximal portion are visible.

2. The end effector of claim 1, further comprising:
a plurality of jackets over the plurality of spines, wherein the plurality of jackets extend and over a majority of the cloverleaf structure such that the atraumatic structure comprises a respective distal portion of each jacket of the plurality of jackets.

3. The end effector of claim 2, wherein the inner arcs extend from distal ends of the plurality of jackets and between adjacent jackets of the plurality of jackets.

4. The end effector of claim 2, further comprising:
a sensor disposed between the cloverleaf structure and a distal portion of a jacket of the plurality of jackets; and
a plurality of electrodes coupled to the plurality of spines such that a respective electrode of the plurality of electrodes is coupled to a respective spine of the plurality of spines.

5. The end effector of claim 4, the sensor being disposed in a distal direction in relation to a distal surface of the support frame in the basket configuration.

6. The end effector of claim 4, the sensor comprising a contact force sensor.

7. The end effector of claim 4, the sensor comprising a position sensor.

8. The end effector of claim 7, the position sensor comprising an inductive coil.

9. The end effector of claim 7, the position sensor comprising a magnetic sensor.

10. The end effector of claim 1, further comprising:
a plurality of electrodes positioned in pairs such that each spine comprises a respective electrode pair and such that the respective electrode pair of a spine does not longitudinally overlap an electrode pair of an adjacent spine.

11. The end effector of claim 10,
wherein the plurality of electrodes comprises proximal pairs of electrodes and distal pairs of electrodes such that the proximal pairs of electrodes and distal pairs of electrodes are positioned in an alternating fashion on the plurality of spines, and
wherein the proximal pairs of electrodes are entirely proximal of an equator of the basket configuration.

12. The end effector of claim 10, wherein each electrode of the plurality of electrodes comprises a body defining a hollow portion extending through the body of the electrode so that a spine can be inserted into the hollow portion and retained on the spine.

13. The end effector of claim 12, wherein each spine comprises a retention member configured to be compressed to allow an electrode to be moved over the retention member, and the retention member being configured to expand to inhibit movement of the electrode along the spine.

14. The end effector of claim 10, wherein the plurality of electrodes is configured to deliver electrical pulses for irreversible electroporation, the electrical pulses including a peak voltage of at least 900 volts (V).

15. The end effector of claim 1, wherein the plurality of spines is configured to form an approximately spherically-shaped basket assembly when in the basket configuration.

16. The end effector of claim 1, wherein the plurality of spines is configured to form an approximately oblate-spheroid basket assembly when in the basket configuration.

* * * * *